(12) United States Patent
Sasaki et al.

(10) Patent No.: US 8,650,987 B2
(45) Date of Patent: Feb. 18, 2014

(54) DRIVING FORCE DISTRIBUTION/TRANSMISSION DEVICE

(75) Inventors: Susumu Sasaki, Tochigi (JP); Atsushi Tamura, Tochigi (JP); Isao Hirota, Tochigi (JP)

(73) Assignee: GKN Driveline Torque Technology K.K., Tochigi (JP)

( * ) Notice: Subject to any disclaimer, the term of this patent is extended or adjusted under 35 U.S.C. 154(b) by 1127 days.

(21) Appl. No.: 12/597,870

(22) PCT Filed: May 12, 2008

(86) PCT No.: PCT/JP2008/001184
§ 371 (c)(1),
(2), (4) Date: Oct. 27, 2009

(87) PCT Pub. No.: WO2008/146452
PCT Pub. Date: Dec. 4, 2008

(65) Prior Publication Data
US 2010/0218632 A1    Sep. 2, 2010

(30) Foreign Application Priority Data

May 18, 2007 (JP) ................................. 2007-132400
Dec. 10, 2007 (JP) ................................. 2007-318972

(51) Int. Cl.
*F16H 37/06*    (2006.01)
(52) U.S. Cl.
USPC .................................................... 74/665 GB
(58) Field of Classification Search
USPC ....... 74/650, 665 F, 665 G, 665 GA, 665 GB, 74/665 GC
See application file for complete search history.

(56) References Cited

U.S. PATENT DOCUMENTS

| | | | | |
|---|---|---|---|---|
| 4,681,180 A | * | 7/1987 | Oyama et al. | 180/76 |
| 5,690,002 A | * | 11/1997 | Showalter | 74/650 |
| 5,845,546 A | * | 12/1998 | Knowles et al. | 74/650 |
| 5,884,738 A | * | 3/1999 | Joslin et al. | 192/35 |
| 6,012,560 A | * | 1/2000 | Kuroda et al. | 192/35 |
| 6,070,495 A | * | 6/2000 | Kuroda et al. | 74/650 |
| 6,105,703 A | * | 8/2000 | Kuroda et al. | 180/248 |

(Continued)

FOREIGN PATENT DOCUMENTS

| | | |
|---|---|---|
| JP | 8-210471 | 8/1996 |
| JP | 2542423 | 10/1996 |

(Continued)

*Primary Examiner* — Troy Chambers
*Assistant Examiner* — Michael Gonzalez
(74) *Attorney, Agent, or Firm* — Jordan and Hamburg LLP

(57) ABSTRACT

A driving force distribution/transmission device suppresses a shift of lubrication oil when a vehicle makes a turn, smoothly lubricates sliding parts, and improves reliability.

The driving force distribution/transmission device 1 includes a gear input rotary member 53 and a gear output rotary member 55 that are interlocked to transmit a driving force through the meshing of a drive pinion gear 91 and a ring gear 93; and a left-right pair of clutch output adjusting mechanisms 57 and 59 coupled with both ends of the gear output rotary member 55, to carry out a driving force output adjustment through the engagement of frictional multiplate clutches 139. A closed and partitioned gear room 56 contains the drive pinion gear 91 and ring gear 93 therein. The main clutches 139 are contained in a left-right pair of closed and partitioned clutch rooms 125, respectively. Lubrication spaces in the three separate rooms, i.e., the gear room 56 and the left-right pair of clutch rooms 125 separately seal gear oil and clutch oil therein.

19 Claims, 12 Drawing Sheets

(56) References Cited

U.S. PATENT DOCUMENTS

| | | | |
|---|---|---|---|
| 6,327,935 B1 * | 12/2001 | Joslin et al. | 74/650 |
| 6,378,677 B1 * | 4/2002 | Kuroda et al. | 192/35 |
| 6,533,090 B2 * | 3/2003 | Osborn et al. | 192/48.2 |
| 6,622,837 B2 * | 9/2003 | Ochab et al. | 192/35 |
| 6,761,662 B2 * | 7/2004 | Iwazaki et al. | 475/221 |
| 6,817,434 B1 * | 11/2004 | Sweet | 180/245 |
| 7,007,763 B2 * | 3/2006 | Ginther et al. | 180/6.2 |
| 7,111,702 B2 * | 9/2006 | Perlick et al. | 180/233 |

FOREIGN PATENT DOCUMENTS

| | | | |
|---|---|---|---|
| JP | 9-328021 | | 12/1997 |
| JP | 10-194003 | | 7/1998 |
| JP | 10194003 A | * | 7/1998 |
| JP | 10-281267 | | 10/1998 |
| JP | 2006-253400 | | 9/2006 |

* cited by examiner

DRIVING FORCE DISTRIBUTION/TRANSMISSION DEVICE

TECHNICAL FIELD

The present invention relates to a driving force distribution/transmission device for a vehicle and the like, capable of distributing and outputting an input driving force.

BACKGROUND TECHNOLOGY

A known driving force distribution/transmission device for a vehicle and the like is a differential unit having two adjustable clutches.

This differential unit transmits an input driving force to a gear output member through meshing hypoid gears that are examples of two gears arranged on different axes. The gear output member transfers and outputs the driving force through the engagement adjustment of the two adjustable clutches.

This differential unit is arranged in, for example, a secondary drive line of a four-wheel-drive vehicle, to distribute and output a driving force from an engine to left and right wheels through the output adjustment of the driving force conducted by the two adjustable clutches.

Such a differential unit, however, connects a lubrication space of the hypoid gears to a lubrication space of the adjustable clutches, to raise a risk of biasing lubrication oil toward one of the adjustable clutches when the vehicle makes a turn, causing insufficient lubrication on sliding parts such as the other adjustable clutch, and thereby deteriorating reliability.

Patent Literature 1; Japanese Unexamined Patent Application Publication No. H09-328021

DISCLOSURE OF INVENTION

Problems to be Solved by Invention

Problems to be solved by the invention include the shifting of lubrication oil that occurs when, for example, the vehicle makes a turn, to cause insufficient lubrication on sliding parts and deteriorate reliability.

Means to Solve the Problems

The present invention suppresses the lubrication oil shifting during, for example, a turn of the vehicle, smoothly lubricates sliding parts, and improves reliability. For this, the present invention provides a driving force distribution/transmission device including a gear input rotary member and a gear output rotary member that are interlocked to transmit a driving force through the meshing of two gears arranged on different axes; and a left-right pair of clutch output adjusting mechanisms coupled with both ends of the gear output rotary member, to carry out a driving force output adjustment through the engagement of frictional multiplate clutches. The two gears arranged on the different axes are contained in a closed and partitioned gear room. The frictional multiplate clutches are contained in a left-right pair of closed and partitioned clutch rooms, respectively. Lubrication spaces in the three separate rooms, i.e., the gear room and the left-right pair of clutch rooms separately seal lubrication oil therein.

Effect of Invention

The driving force distribution/transmission device according to the present invention includes the gear input rotary member and gear output rotary member that are interlocked to transmit a driving force through the meshing of the two gears arranged on the different axes; and the left-right pair of clutch output adjusting mechanisms coupled with both ends of the gear output rotary member, to carry out a driving force output adjustment through the engagement of the frictional multiplate clutches. The two gears arranged on the different axes are contained in the closed and partitioned gear room. The frictional multiplate clutches are contained in the left-right pair of closed and partitioned clutch rooms, respectively. The lubrication spaces in the three separate rooms, i.e., the gear room and the left-right pair of clutch rooms separately seal lubrication oil therein. Even when a vehicle makes a turn, the gear room and the left-right pair of clutch rooms keep the lubrication oil sealed therein. The oil never shift or move to the left or the right among the gear room and the left-right pair of clutch rooms. Each room contains a proper amount of oil to smoothly lubricate sliding parts, improve lubrication reliability, suppress stir resistance due to rotary members, and reduce a loss of driving force.

BEST MODE OF IMPLEMENTING INVENTION

The objects of suppressing a shift of lubrication oil even during a turn and the like, smoothly lubricating sliding parts, and improving reliability are realized by sealing lubrication oil in each of the three separate lubrication spaces.

Embodiment 1

[Four-Wheel-Drive Vehicle]

FIG. 1 relates to Embodiment 1 of the present invention, illustrates an arrangement of a driving force distribution/transmission device, and is a skeleton plan view of a four-wheel-drive, front-drive-base (FF-base) vehicle with a transverse front engine.

As illustrated in FIG. 1, the driving force distribution/transmission device 1 is arranged between rear-wheel axles 3 and 5. An input side of the driving force distribution/transmission device 1 is interlocked through a universal joint 7 with a propeller shaft 9. The rear-wheel axles 3 and 5 are interlocked with the output side of the driving force distribution/transmission device 1.

The rear-wheel axles 3 and 5 are interlocked with left and right rear wheels 11 and 13. The propeller shaft 9 is joined through a universal joint 15 with an output shaft 19 of a transfer 17.

An orthogonal gear 21 of the output shaft 19 meshes with an orthogonal gear 25 of a transmission shaft 23. A helical gear 27 of the transmission shaft 23 meshes with a helical gear 29. The helical gear 29 is arranged on a hollow transmission shaft 35. The hollow transmission shaft 35 is connected to a differential case 33 of a front differential unit 31 so as to rotate together.

A ring gear 36 of the front differential unit 31 receives a driving force from an engine 37 through an electric motor 39 and a transmission 41. The front differential unit 31 is interlocked through left and right front-wheel axles 45 and 47 with left and right front wheels 49 and 51.

Accordingly, from the engine 37 through the electric motor 39 and transmission 41, a driving force is inputted to the ring gear 36 of the front differential unit 31. From the ring gear 36, the driving force is transmitted through the front-wheel axles 45 and 47 to the left and right front wheels 49 and 51, on the one hand. On the other hand, through the differential case 33, hollow transmission shaft 35, helical gears 29 and 27, transmission shaft 23, and orthogonal gears 25 and 21, the driving force is transmitted to the output shaft 19.

From the output shaft 19 through the universal joint 15, propeller shaft 9, and universal joint 7, the driving force is inputted to the driving force distribution/transmission device 1.

Accordingly, when the driving force distribution/transmission device 1 is in a driving force adjustment/transmission state, the driving force inputted to the driving force distribution/transmission device 1 is adjusted for output and is transmitted through the left and right rear-wheel axles 3 and 5 to the left and right rear wheels 11 and 13, so that the vehicle runs in a four-wheel-drive state with the front wheels 49 and 51 and rear wheels 11 and 13 being driven. When the driving force distribution/transmission device 1 is not in the driving force adjustment/transmission state, the vehicle runs in a two-wheel-drive state with the front wheels 49 and 51 being driven.

The driving force distribution/transmission device 1 receives a driving force from the engine 37 through the propeller shaft 9. Instead of the engine 37 and electric motor 39, the device 1 may be driven by a discrete driving source such as an electric motor.

[Driving Force Distribution/Transmission Device]

The details of the driving force distribution/transmission device 1 are illustrated in FIG. 2. FIG. 2 is a horizontal section of the driving force distribution/transmission device 1.

As illustrated in FIG. 2, the driving force distribution/transmission device 1 has a gear input rotary member 53, a gear output rotary member 55, and a left-right pair of clutch output adjusting mechanisms 57 and 59.

[Gear Input and Output Rotary Members]

The gear input rotary member 53 and gear output rotary member 55 are rotatably supported by a gear carrier 61. The clutch output adjusting mechanisms 57 and 59 are supported by clutch carriers 63, which are attached to the gear carrier 61.

The gear carrier 61 comprises a gear carrier body 62 and a gear carrier cover 64. The gear carrier 61 rotatably supports the gear input rotary member 53 and gear output rotary member 55, forms a gear room 56, and includes an input-side support cylinder 65 and output-side support walls 67 and 69. The output-side support walls 67 and 69 each have a stepped inner circumference. The output-side support wall 67 forms the gear carrier cover 64, includes a fastening flange 71 and a fitting part 73, and is separately formed so that it is detachable with respect to the gear carrier body 62.

The fitting part 73 is fitted to a fitting opening 75 of the gear carrier 61 and the fastening flange 71 is removably fixed to a fastening part 79 of the gear carrier body 62 with bolts 77. Between the fitting part 73 and the fitting opening 75, a sealing member 81 such as an O-ring is interposed.

On axial left and right outer sides of the output-side support walls 67 and 69, there are recesses 80 and 82. The recesses 80 and 82 are recessed toward the gear room 56. On the outer circumferential side of the recesses 80 and 82, there are carrier joints 83 and 84 integrally with the output-side support walls 67 and 69. The carrier joints 83 and 84 have carrier fitting openings 86 and 88. The carrier joints 83 and 84 have inner circumferential faces 90 and 92 that are tapered.

Between the input-side support cylinder 65 and the output-side support walls 67 and 69, there is partitioned the closed gear room 56. The gear room 56 communicates with a drain hole 87 having a drain plug 89. A filler plug hole that is not illustrated has a filler plug.

According to the embodiment, the gear input rotary member 53 and gear output rotary member 55 are interlocked to transmit a driving force through a drive pinion gear 91 and a ring gear 93 that mesh with each other. The drive pinion gear 91 and ring gear 93 are a pair of hypoid gears that are the two gears arranged on different axes.

Examples of the two gears arranged on different axes include a pair of bevel gears, a pair of parallel gears, a pair of worm gears and the like. The presence of and the degree of a twist angle of each gear are properly determined according to requirements.

The gear input rotary member 53 is a solid drive pinion shaft that is integrally provided with the drive pinion gear 91 and is rotatably supported by the input-side support cylinder 65 of the gear carrier 61 through taper roller bearings 95 and 97. The gear input rotary member 53 is provided with a coupling flange member 99 for the universal joint 7. Between an outer circumferential face of the coupling flange member 99 and an end inner circumferential face of the input-side support cylinder 65, a sealing member 101 is interposed. The coupling flange member 99 is provided with a dust cover 103 on the outer side of the sealing member 101.

The gear output rotary member 55 is a hollow shaft and has a gear attaching flange 105 at the middle portion of an outer circumferential part, and at each end thereof, stepped centering parts 107 and 109 for supporting shafts. The gear output rotary member 55 has output inner splines 111 and 113 on the inner circumferences of the centering parts 107 and 109.

On the gear output rotary member 55, the ring gear 93 is fixed to the gear attaching flange 105 with bolts 115 and the centering parts 107 and 109 are rotatably supported by the output-side support walls 67 and 69 through taper roller bearings 117 and 119.

The taper roller bearings 117 and 119 are positioned without play through shims 120 and 122 with respect to the output-side support walls 67 and 69.

On the axial outer sides of the taper roller bearings 117 and 119, seals 121 and 123 are interposed between the output-side support walls 67 and 69 and the ends of the gear output rotary member 55. The sealing members 121 and 123 are positioned on the inner circumferential sides of the recesses 80 and 82.

The gear room 56 is partitioned in a closed state within the gear carrier 61 with the sealing members 81, 101, 121, and 123, to seal therein gear oil serving as lubrication oil. The gear oil is of a different kind from and has a higher viscosity than lubrication oil in the clutch output adjusting mechanisms 57 and 59.

[Clutch Output Adjusting Mechanism]

The left-right pair of clutch output adjusting mechanisms 57 and 59 has a left-right symmetrical structure. The clutch output adjusting mechanisms 57 and 59 are coupled with the ends of the gear output rotary member 55 and conduct driving force output adjustment through the engagement of frictional multiplate clutches.

FIG. 3 is an enlarged sectional view of the clutch output adjusting mechanism 59.

The clutch output adjusting mechanism 59 will be explained with reference to FIG. 3. In connection with the clutch output adjusting mechanism 57, corresponding parts are represented with like reference marks to omit overlapping explanations.

The clutch output adjusting mechanism 59 is supported by the clutch carrier 63 that is attached to the gear carrier 61 and forms a left-right pair of clutch rooms 125.

The clutch carrier 63 has, at an axial inner end portion (left end portion in FIG. 3), a carrier fitting part 127 and a carrier fastening flange 129, and at an outer end portion (right end portion in FIG. 3), a shaft support part 130 protruding on a radial inner side.

An inner circumferential face 132 of the clutch carrier 63 is tapered toward an axial outer end side, to shift and guide splashed lubrication oil in an axial outer end direction.

The left-right pair of clutch rooms 125 each are sealed with sealing members that are explained later and are interposed between two members that do not turn relative to each other. The clutch room 125 seals clutch oil that is different from and has a lower viscosity than the gear oil in the gear room 56 and keeps liquidity under low temperatures in, for example, winter. The clutch room 125 may contain lubrication oil similar to the gear oil.

The carrier fitting part 127 is fitted to the carrier fitting opening 88 (86) of the gear carrier 61. The carrier fastening flange 129 is removably fixed to the carrier joint 84 (83) of the gear carrier 61 with bolts 131. Between the carrier fitting part 127 and the carrier fitting opening 88 (86), a sealing member 133 such as an O-ring is interposed. There is no relative rotation between the carrier fitting part 127 and the carrier fitting opening 88 (86), so that the sealing member 133 is interposed between the two members having no relative rotation.

The clutch output adjusting mechanism 59 has a clutch input rotary member 135 and a clutch output rotary member 137. A main clutch 139 that is a frictional multiplate clutch is interposed between the clutch input and output rotary members 135 and 137.

The clutch input rotary member 135 includes a joint shaft 141 and a clutch housing 143 that is integrally joined with an outer circumferential side of the joint shaft 141 by, for example, welding. The joint shaft 141 is axially removably coupled and interlocked with the gear output rotary member 55 through axial movement. The outer circumference of a first end of the joint shaft 141 is provided with a clutch input spline 145 and a second end thereof is provided with a shaft coupling support 147 having a stepped shape.

The clutch housing 143 has a housing circumferential wall 150 having a clutch inner spline 149. At a first end of the clutch housing 143, there is a housing vertical wall 151. The housing vertical wall 151 has a housing recess 152. The housing recess 152 is formed to protrude toward the output-side support wall 69 (67) of the gear carrier 61. Due to the protruding shape, the housing recess 152 faces a clutch hub 157.

The housing vertical wall 151 partly enters the recess 82 (80) of the gear carrier 61 in a left-right axial direction. Due to the protruding shape of the housing vertical wall 151, the clutch inner spline 149 of the clutch housing 143 can keep the length thereof within a limited space.

The housing circumferential wall 150 is formed to be positioned on the outer circumferential side of the shaft coupling support 147 of the joint shaft 141 so as to surround the outer circumferential side of the shaft coupling support 147. The housing circumferential wall 150 is provided with a through window 144 that has a slit shape formed by, for example, cutting off tooth of the clutch inner spline 149 and serves as a second communication part. The through window 144 opens the outer side of the main clutch 139, to pass the clutch oil from the inside to the inner circumferential face 132 of the outside clutch carrier 63.

The housing vertical wall 151 of the clutch housing 143 is provided with a housing oil hole 146 that is a through hole extending in a left-right axial direction and serves as a third communication part between the joint shaft 141 and the main clutch 139.

In connection with the clutch input rotary member 135, the joint shaft 141 engages with an end of the gear output rotary member 55 and the clutch input spline 145 spline-engages with the output inner spline 113 (111) of the gear output rotary member 55.

Accordingly, the output inner spline 113 (111) and clutch input spline 145 for joining the gear output rotary member 55 and clutch input rotary member 135 together can be arranged on the inner circumferential side of the taper roller bearing 119 (117), to effectively use a space in a diametrical direction and realize compactness in an axial direction.

Between the gear output rotary member 55 and the joint shaft 141 of the clutch input rotary member 135, a sealing member 153 such as an O-ring is interposed. There is no relative rotation between the gear output rotary member 55 and the joint shaft 141. Namely, the sealing member 153 is interposed between two members that cause no relative rotation. Unlike the embodiment that arranges a sealing member such as an O-ring, the inner circumferential face of the gear output rotary member 55 and the outer circumferential face of the joint shaft 141 may directly be sealed to each other by, for example, press fit. Alternatively, a sealing material such as a liquid gasket may be interposed between them. A pair of the sealing members 153 is arranged on the outer circumferences of the joint shafts 141 and the joint shafts 141 are inserted from left and right axial directions into the hollow gear output rotary member 55. Accordingly, for the sake of assembling, an intermediate portion of the gear output rotary member 55 may have a pressure release hole.

The clutch output rotary member 137 comprises a clutch output hollow shaft 155 and the clutch hub 157.

The clutch output hollow shaft 155 has, on its outer circumferential face, a hub joint spline 159, and at ends, stepped centering parts 161 and 163. The clutch output hollow shaft 155 is hollow and has, on an inner circumference, an axle joint inner spline 165. The rear-wheel axles 3 and 5 are inserted from outer ends and are interlocked with the axle joint inner spline 165. The inner circumference of the clutch output hollow shaft 155 has, at an end, a closing plug 167 serving as a closing member to keep the clutch room 125 in a closed state. The closing member may be a separate member such as the closing plug 167 or may be a closing wall that is integral with the clutch output hollow shaft 155.

The clutch hub 157 has, on its outer circumference, a clutch spline 169, and on its inner circumference, a hub inner spline 171. An end of the hub inner spline 171 has a ring positioning recess 173. The clutch hub 157 has a hub through part 170 having a slit shape serving as a first communication part that extends from a diametrically intermediate portion to an outer circumference. The hub through part 170 is formed by, for example, partially cutting off tooth of the clutch spline 169 of the clutch hub 157. The hub through part 170 opens the inside of the main clutch 139, to pass the clutch oil from the inside to the inner circumferential side of the main clutch 139.

In connection with the clutch hub 157, the hub inner spline 171 is spline-coupled with the hub joint spline 159 of the clutch output hollow shaft 155 and is restricted in moving toward an axially inner end by a snap ring 175 that serves as a stopper and is attached to the hub joint spline 159. With the snap ring 175, the ring positioning recess 173 of the clutch hub 157 engages so that a slight gap is kept on the outer circumferential side of the snap ring. This prevents the snap ring 175 from expanding outward and dropping off.

In this attached state, the outer circumferential side of the clutch hub 157 having the clutch spline 169 is in the vicinity of the housing vertical wall 151 of the clutch housing 143 and an end of the clutch hub 157 faces the housing recess 152.

Accordingly, the clutch hub 157 and housing vertical wall 151 axially overlap each other, to allow the clutch spline 169 to be elongated according to the clutch inner spline 149.

This enables a sufficient number of plates of the main clutch 139 to be interposed between the clutch housing 143 and the clutch hub 157, or allows the number of the plates to be increased, while keeping the left-right axial size compact. This results in reducing fitting angles of the left and right axles 3 and 5, minimizing driving losses at the joints of the left and right axles, suppressing heat generation at the joints, and securing and improving the durability of the joints.

At a first end of the clutch output hollow shaft 155 (a first end of the clutch output rotary member 137), the centering part 161 is rotatably supported through a ball bearing 177 by the shaft coupling support 147 of the clutch input rotary member 135. The ball bearing 177 is positioned at the shaft coupling support 147 and centering part 161 without play with a shim 178 and snap ring (or washer) 180.

The coupling support of the clutch input rotary member 135 and clutch output rotary member 137 by the ball bearing 177 is carried out on the inner circumferential side of the housing circumferential wall 150 of the clutch housing 143. This effectively uses a circumferential space and realizes compactness in an axial direction. This results in reducing fitting angles of the left and right axles 3 and 5 coupled with the clutch output rotary members 137, minimizing driving losses at the joints of the left and right axles, suppressing heat generation at the joints, and securing and improving the durability of the joints.

At a second end of the clutch output hollow shaft 155 (at a second end of the clutch output rotary member 137), the centering part 163 is rotatably supported through a ball bearing 179 by the shaft support 130 of the clutch carrier 63. On the axially outer side of the ball bearing 179, a sealing member 181 is interposed between the clutch carrier 63 and the clutch output hollow shaft 155 of the clutch output rotary member 137.

The main clutch 139 includes a plurality of outer plates 183 and inner plates 185. Each outer plate 183 is made of a thin plate on which a paper material or a carbon sheet is attached, or a carbon-coated thin plate. Each inner plate 185 is made of a steel thick plate without a paper material.

At an end of the main clutch 139, a pressure receiving plate 187 is arranged. The pressure receiving plate 187 has a ring positioning recess 189 and is spline-coupled with the clutch hub 157.

The pressure receiving plate 187 is restricted in axial movement by a snap ring 191 attached to the clutch hub 157. The snap ring 191 engages with the ring positioning recess 189 with a slight circumferential gap being kept between them, to prevent the snap ring 191 from expanding outward and dropping off.

Adjacent to the pressure receiving plate 187, there is the outer plate 183 of the main clutch 139, the outer plate being a thin plate covered with a paper material or carbon sheet, or a carbon-coated thin plate.

The clutch output adjusting mechanism 59 includes, in addition to the main clutch 139, a pilot clutch 193, a ball cam 195, a cam ring 197, a pressure plate 199, a return spring 201, an armature 203, a rotor 205, and an electromagnet 207 serving as an operation source of the pilot clutch 193.

The pilot clutch 193 is arranged between the clutch housing 143 and the cam ring 197. Outer plates of the pilot clutch 193 engage with the inner spline 149 of the clutch housing 143 and inner plates of the pilot clutch 193 engage with a spline 209 of the cam ring 197. The outer and inner plates of the pilot clutch 193 each are provided with a hole 210 serving as a nonmagnetic part.

The cam ring 197 is rotatably supported on the outer circumference of the hollow shaft 155. The ball cam 195 serving as a cam mechanism is arranged between the pressure plate 199 and the cam ring 197. The cam ring 197 and pressure plate 199 axially face each other with the ball cam 195 interposed between them.

The pressure plate 199 is arranged adjacent to the main clutch 139 and is engaged with the spline 159 of the hollow shaft 155 to rotate with the hollow shaft 155 and be movable axially. Receiving thrust from the ball cam 195, the pressure plate 199 moves to push the main clutch 139.

Adjacent to the pressure plate 199, there is the inner plate 185 of the main clutch 139, the inner plate 185 being a thick plate without paper material. Since the pressure plate 199 does not slide on the inner plate 185, the inner plate can be a thick plate without paper material, to omit paper material.

The return spring 201 is a disk spring interposed between the clutch hub 157 and the pressure plate 199, to push the pressure plate 199 in a direction to release the main clutch 139.

Between the cam ring 197 and the rotor 205, a thrust bearing 213 is arranged. The thrust bearing 213 receives reaction force from the ball cam 195 and absorbs relative rotation between the cam ring 197 and the rotor 205.

The rotor 205 has a nonmagnetic part 215 and is rotatably supported around the hollow shaft 155. The rotor 205 is provided with a rotor oil hole 218 that is on the radially inner side of the electromagnet 207, axially passes through the rotor 205, and serves as a fourth communicating part. Axial movement of the rotor 205 is restricted by a snap ring 219 serving as a stopper fitted to the hollow shaft 155.

The armature 203 has a ring shape, is arranged between the pressure plate 199 and the pilot clutch 193, and faces the rotor 205 with the pilot clutch 193 interposed between them. The armature 203 engages with the inner spline 149 of the clutch housing 143 and is axially movable.

The electromagnet 207 is fixed to the clutch carrier 63. Between a core 221 of the electromagnet 207 and the rotor 205, there is formed a proper air gap. The air gap, rotor 205, pilot clutch 193, and armature 203 form a magnetic path of the electromagnet 207. When energized, the electromagnet 207 forms a magnetic flux loop extending along the nonmagnetic part 215, the periphery of the nonmagnetic hole 210, and the armature 203.

[Lubrication Spaces of Three Rooms]

As mentioned above, the drive pinion gear 91 and ring gear 93 are contained in the sealed and partitioned gear room 56. Essential parts of the clutch adjusting mechanisms 57 and 59 including the main clutch 139 are contained in the left-right pair of sealed and partitioned clutch rooms 125. Lubrication oil is sealed in each of lubrication spaces of the three independent rooms, i.e., the gear room 56 and left-right pair of clutch rooms 125.

The three independent rooms involve a plurality of seals including the sealing member 133 between the gear carrier 61 and the clutch carrier 63, the sealing member 123 between the gear carrier 61 and the gear output rotary member 55, the sealing member 153 between the gear output rotary member 55 and the clutch input rotary member 135, and the sealing member 181 between the clutch carrier 63 and the clutch output rotary member 137. These sealing members secure the independent closed three rooms.

[Other Related Structures]

FIG. 4 is a side view illustrating the clutch output adjusting mechanism, FIG. 5 is an enlarged sectional view illustrating a breather installing part, FIG. 6 is an enlarged sectional view illustrating a drain plug installing part, FIG. 7 is an enlarged sectional view illustrating an oil channel, FIG. 8 is an enlarged sectional view illustrating a magnet rotation stopper, and FIG. 9 is an enlarged sectional view illustrating a connector installing part.

In FIG. 4, a filler plug 230 is arranged at a part of the periphery of the clutch carrier 63. The filler plug 230 is fitted to a hole whose perpendicular lower end defines a level (quantity) of oil to be sealed.

In FIGS. 3, 4, and 5, the clutch carrier 63 has a breather hole 223 for discharging air. The breather hole 223 is connected to a breather pipe 225.

In FIGS. 3, 4, and 6, the clutch carrier 63 has a drain hole 227 for draining oil. To the drain hole 227, a drain plug 229 is fitted.

In FIGS. 3 and 7, a vertical oil channel 231 serving as a fifth communication part is formed between the clutch carrier 63 and the electromagnet 207. The oil channel 231 extends along the inner circumferential face 132 of the clutch carrier 63 and the back of the electromagnet 207 and connects with the clutch room 125 on the radially inner side of the electromagnet 207. It is possible to arrange a plurality of oil channels 231. The clutch oil is axially outwardly (right side in FIG. 3) guided along the inner circumferential face 132 of the clutch carrier 63 and is passed through the oil channel 231 around the electromagnet 207 to the axially left and right sides of the ball bearing 179 on the radially inner side of the electromagnet 207.

In FIGS. 3, 4, and 8, the electromagnet 207 is fixed to the side face of the clutch carrier 63 at circumferential three locations with bolts 233. Between the back of the core 221 of the electromagnet 207 and the inner side face of the clutch carrier 63, there is arranged a sealing member 235 such as an O-ring.

In FIGS. 3, 4, and 9, the clutch carrier 63 has a connector through hole 237 to pass a connector 239 of the electromagnet 207 to the outside of the clutch carrier 63, so that the connector 239 is connected to an external part. Between the back of the core 221 of the electromagnet 207 and the inner side face of the clutch carrier 63, there is arranged a sealing member 241 such as an O-ring.

[Sub-Assembly of Clutch Output Adjusting Mechanism]

The gear carrier 61 has the sealing member 123 between each of the output-side support walls 67 and 69 and the gear output rotary member 55, so that the gear room 56 may separately seal gear oil.

The clutch output adjusting mechanisms 57 and 59 each have the above-mentioned configuration, and therefore, can be made as a sub-assembly as illustrated in FIG. 3.

Namely, according to the configuration of the assembly, the clutch carrier 63 has the carrier fitting part 127 and carrier fastening flange 129 that are at the axial inner end of the clutch carrier 63 and are fitted to the gear carrier 61. At the axial outer end, the clutch carrier 63 has the shaft support part 130 that radially inwardly protrudes.

The clutch input rotary member 135 has the joint shaft 141 that is axially removably connected to the gear output rotary member 55 through splines.

The shaft coupling support 147 of the clutch input rotary member 135 is rotatably supported with the ball bearing 177 at the first end of the clutch output hollow shaft 155 of the clutch output rotary member 137. The second end of the clutch output hollow shaft 155 is rotatably supported with the ball bearing 179 on the shaft support part 130.

The electromagnet 207 is fixed to the clutch carrier 63 in the vicinity of the rotor 205.

The rotor 205 and clutch hub 157 are positioned with the snap rings 219 and 175 on the outer circumference of the clutch output hollow shaft 155.

The clutch output adjusting mechanisms 57 and 59 each are prepared as a sub-assembly and is installed by inserting the joint shaft 141 of the clutch input rotary member 135 into an end of the gear output rotary member 55 so that the clutch input spline 145 may engage with the output inner spline 113 (111).

At the same time, the carrier fitting part 127 of the clutch carrier 63 is fitted to the carrier fitting opening 88 (86) of the gear carrier 61 with the sealing member 133 interposed between them.

Thereafter, the carrier fastening flange 129 is fixed to the carrier joint 84 (83) of the gear carrier 61 with the bolts 131, thereby completing the installation of the sub-assembly, i.e., the clutch output adjusting mechanism 59 (57).

With respect to the clutch output adjusting mechanisms 57 and 59, the rear-wheel axles 3 and 5 are inserted into outer ends of the clutch output hollow shafts 155, to engage with the axle joint inner splines 165.

The axle joint inner splines 165 engaged with the rear-wheel axles 3 and 5 are lubricated with grease. To suppress entries of water, dust and the like into the part lubricated with the grease, it is preferable to arrange, for example, O-rings between the clutch output hollow shafts 155 and the rear-wheel axles 3 and 5 on the axial outer end sides (left and right outer end sides in FIG. 2) of the axle joint inner splines 165.

[Engagement Control of Main Clutch]

The engagement control of the main clutch 139 is carried out through the energization control of the electromagnet 207.

Various sensors detect road conditions and driving/steering conditions including starting, accelerating, and turning conditions. According to the detected conditions, the energization control of the electromagnet 207 is carried out.

When energized, the electromagnet 207 forms the above-mentioned magnetic flux loop, to attract the armature 203, engage the pilot clutch 193 between the armature 203 and the rotor 205, and generate pilot torque. With the pilot torque of the pilot clutch 193, the cam ring 197 is connected to the clutch housing 143 and tries to turn together.

At this time, the pressure plate 199 is connected through the clutch output hollow shaft 155 to the rear-wheel axle 5 (3), and therefore, a relative rotation occurs between the cam ring 197 and the pressure plate 199. As a result, the ball cam 195 generates thrust to axially separate the cam ring 197 and pressure plate 199 from each other.

The thrust is applied through the thrust bearing 213 and rotor 205 to the snap ring 219, and on the other hand, is applied through the pressure plate 199, main clutch 139, snap ring 191, and clutch hub 157 to the snap ring 175.

The thrust to the snap rings 219 and 175 is applied to the clutch output hollow shaft 155, to adjustably engage the main clutch 139 between the pressure plate 199 and the pressure receiving plate 187. In this way, the cam thrust is surely received by the clutch output hollow shaft 155.

When the electromagnet 207 is de-energized, the ball cam 195 loses the thrust. The return spring 201 between the clutch hub 157 and the pressure plate 199 moves the pressure plate 199 away from the main clutch 139. Depending on the separation distance of the pressure plate 199, the engagement of the main clutch 139 is released.

[Driving Force Transmission]

When the electromagnet 207 is energized to adjustably engage the clutch output adjusting mechanism 59 (57), a driving force transmitted from the propeller shaft 9 to the gear input rotary member 53 is transmitted through the drive pinion gear 91, ring gear 93, and gear output rotary member 55 to the clutch input rotary member 135 of the clutch output adjusting mechanism 59 (57).

The driving force to the clutch input rotary member 135 is transmitted to the clutch housing 143, main clutch 139, and clutch hub 157 and is outputted from the clutch output rotary member 137.

The driving force from the clutch output rotary member 137 of the clutch output adjusting mechanism 59 (57) is transmitted through the rear-wheel axle 5 (3) to the rear wheel 13 (11).

As a result, the vehicle runs in a four-wheel-drive state with the front and rear wheels 49, 51, 11, and 13 being driven. At this time, the engagement of the main clutch 139 is adjusted according to the running and steering conditions of the vehicle, to optionally control the differential rotation and differential locking of the left and right rear wheels 11 and 13.

These control operations can conduct yaw control and the like and improve the steering, running, and bad-road driving abilities of the vehicle.

When the clutch output adjusting mechanisms 57 and 59 are not in a driving force output state, the vehicle runs in a two-wheel-drive state with the front wheels 49 and 51 being driven.

When a driving force is transmitted, upthrust force may axially be applied from the rear-wheel axle 5 (3) to the clutch output hollow shaft 155. From the clutch output hollow shaft 155, the upthrust force is transmitted through the centering part 161, ball bearing 177, and shaft coupling support 147 to the clutch input rotary member 135. From the clutch input rotary member 135, the upthrust force is applied to the gear output rotary member 55. From the gear output rotary member 55, the upthrust force is transmitted through the taper roller bearing 119 (117) to the output-side support wall 69 (67). Namely, the upthrust force is surely received by the strong gear carrier 61.

[Lubrication]

Lubrication oil is filled up to the level of the axis of rotation in each of the gear room 56 and left and right clutch rooms 125.

In the gear room 56, the ring gear 93 splashes the gear oil upward when the ring gear 93 is turned, to lubricate the meshing part of the drive pinion gear 91 and ring gear 93 and the taper roller bearings 95 and 97.

In each clutch room 125, the clutch input and output rotary members 135 and 137 and the like splash upward the clutch oil when they are turned.

The splashed clutch oil passes through the hub through part 170 of the clutch hub 157 to lubricate the main clutch 139 and the like. The clutch oil then passes through the through window 144 of the clutch housing 143 and moves along the inner circumferential face 92 (90) of the carrier joint 84 (83) and the inner circumferential face 132 of the clutch carrier 63.

The clutch oil on the inner circumferential faces 92 (90) and 132 is guided and moves due to the inclination of the inner circumferential face 132 in an axial outward direction (rightward in FIG. 3), and due to the inclination of the inner circumferential face 92 (90) in an axial inward direction (leftward in FIG. 3).

The clutch oil moving along the inner circumferential face 132 passes through the oil channel 231 (FIG. 7) around the electromagnet 207 to the axial left and right sides of the ball bearing 179. The clutch oil moving along the back of the rotor 205 passes through the rotor oil hole 218 of the rotor 205 to the cam ring 197.

Such movement of the clutch oil sufficiently lubricates the ball bearing 179, sealing member 181, a portion between the rotor 205 and clutch output hollow shaft 155, thrust bearing 213, pilot clutch 193, ball cam 195, and the like.

The clutch oil on the inner circumferential face 92 (90) is guided and moves between the output-side support wall 69 (67) of the gear carrier 61 and the clutch housing 143, passes through the housing oil hole 146, and returns to the inside of the clutch housing 143.

To guide the clutch oil, the inner circumferential faces 90, 92, 132, and the like may have guide channels. It is preferable to arrange such guide channels at locations where the clutch oil collects due to rotational force and gravity acting on the clutch oil.

The clutch oil that moves as mentioned above suppresses temperature rise due to the sliding of the main clutch 139 and pilot clutch 193.

Even if the vehicle slants in a horizontal direction when it turns a curve or runs on a slanted road or even if the vehicle receives a large leftward or rightward G-force, the lubrication oil never moves among the left-right pair of independent clutch rooms 125 and central gear room 56. Namely, the lubrication oil never collects into one room. The lubrication spaces of the independent three rooms each can keep the lubrication oil.

The driving source of the pilot clutch 193 is not limited to the electromagnet. The driving source may be selected from a hydraulic cylinder-piston, an electric motor, and the like. The driving source is fixed to the clutch carrier 63, to surely conduct the engagement operation of the clutch.

Effect of Embodiment 1

The driving force distribution/transmission device 1 according to Embodiment 1 includes the gear input rotary member 53 and gear output rotary member 55 that are interlocked with each other to transmit a driving force through the meshing of the drive pinion gear 91 and ring gear 93; and the left-right pair of clutch output adjusting mechanisms 57 and 59 that are connected to ends of the gear output rotary member 55, to adjust a driving force output through the engagement of the main clutches. The drive pinion gear 91 and ring gear 93 are accommodated in the gear room 56 that is partitioned in a closed state. The main clutches 139 are accommodated in the left-right pair of partitioned and closed clutch rooms 125, respectively. The lubrication spaces of the three independent rooms, i.e., the gear room 56 and left-right pair of clutch rooms 125 seal gear oil and clutch oil.

Even when the vehicle makes a turn, the gear room 56 properly keeps the presence of the sealed gear oil and the left-right pair of clutch rooms 125 properly keeps the presence of the sealed clutch oil, to smoothly lubricate sliding parts such as the main clutches 139 and improve reliability. Each room contains a proper amount of oil necessary for lubrication, to suppress stir resistance due to rotary members, reduce a loss of driving force, and improve mileage.

The lubrication spaces of the three rooms have sealing members 133 and 153 each interposed between two members that do not rotate relative to each other.

This improves the durability of the sealing members 133 and 153.

The clutch carrier 63 has the carrier fitting part 127 that is at the axial inner end of the clutch carrier 63 and is fitted to the gear carrier 61. At an axial outer end, the clutch carrier 63 has the shaft support part 130 that radially inwardly protrudes. The clutch input rotary member 135 has the joint shaft 141 that is axially removably connected to the gear output rotary member 55 through axial movement. The shaft coupling support 147 at the first end of the clutch output rotary member 137 rotatably supports, through the ball bearing 177, the clutch input rotary member 135. The second end of the clutch output rotary member 137 is rotatably supported, through the ball bearing 179, by the shaft support part 130.

Due to this, the clutch carrier 63, clutch input and output rotary members 135 and 137, main clutch 139, and the like are assembled into a sub-assembly. The sub-assembly is the clutch output adjusting mechanism 59 (57) which is a so-called clutch pack that is easily attached to the gear carrier 61 and gear output rotary member 55 with the use of the carrier fitting part 127 of the clutch carrier 63 and the joint shaft 141.

The pressure plate 199 is arranged adjacent to the main clutch 139, is rotatably engaged with the outer circumference of the clutch output hollow shaft 155, and is axially movable to provide pressure to engage the main clutch 139. The cam ring 197 is arranged to axially face the pressure plate 199 through the ball cam 195 and is relatively rotatably supported by the outer circumference of the clutch output hollow shaft 155. The pilot clutch 193 is arranged between the clutch housing 141 and the cam ring 197. The armature 203 and the rotor 205 having the nonmagnetic part 215 are oppositely arranged on each side of the pilot clutch 193. The electromagnet 207 is arranged adjacent to the rotor 205, is fixedly supported by the clutch carrier 63, and forms a flux loop extending around the nonmagnetic part 215 of the rotor 205 and armature 203.

The functional parts for engaging the main clutch 139 can be included in the clutch carrier 63 to form the clutch pack. This further makes the attaching work of the clutch pack easier.

The hub through part 170 and through window 144 are formed on the clutch housing 143 of the clutch input rotary member 135 and the clutch hub 157 of the clutch output rotary member 137, to open both the inner and outer circumferential sides of the main clutch and pass the clutch oil from the inner circumferential side thereof to the inner circumferential face 132 of the clutch carrier 63 on the outer circumferential side of the main clutch. The housing oil hole 146 is axially formed through the housing vertical wall 151 of the clutch input rotary member 135 between the joint shaft 141 and the main clutch 139.

With this, a passage for the clutch oil that is splashed upward at the time of rotation is formed by the hub through part 170, through window 144, and housing oil hole 146, to surely lubricate sliding parts such as the main clutch 139.

The clutch output rotary member 137 has the clutch output hollow shaft 155 that is hollow and is interlocked with the rear-wheel axle 5 (3) inserted into the outer end thereof. An outer circumference at an inner end of the clutch output hollow shaft 155 rotatably supports through the ball bearing 177 the shaft coupling support 147 of the clutch input rotary member 135. An inner circumference at the inner end of the clutch output hollow shaft 155 is provided with the closing plug 167 to maintain the sealed state of the clutch room 125.

With this, the clutch room 125 of the clutch output adjusting mechanism 59 (57) assembled as a clutch pack is surely sealed.

The clutch output rotary member 137 comprises the clutch output hollow shaft 155 that is hollow and is interlocked with an axle inserted into the outer end thereof and the clutch hub 157 that is spline-engaged with the outer circumference of the clutch output hollow shaft 155. The outer circumference of the clutch output hollow shaft 155 is provided with the snap rings 175 and 219 that restrict axial movement of the clutch hub 157 and receive cam thrust from the ball cam 195.

With this, the cam thrust to the snap rings 175 and 219 is inputted to the clutch output hollow shaft 155, to surely adjust the engagement of the main clutch 139 between the pressure plate 199 and the pressure receiving plate 187.

The rotor 205 is provided with the rotor oil hole 218 that axially extends through the rotor 205 on the radially inner side of the electromagnet 207. Between the clutch carrier 63 and the electromagnet 207, the oil channel 231 is arranged that extends from the inner circumferential face 132 of the clutch carrier 63, passes behind the electromagnet 207, and communicates with the clutch chamber 125 on the radially inner side of the electromagnet 207.

With this, a passage for clutch oil that is splashed upward at the time of rotation is formed by the hub through part 170, through window 144, housing oil hole 146, rotor oil hole 218, and oil channel 231, to surely lubricate each of the sliding parts such as the main clutch 139.

The gear room 56 and the left-right pair of clutch rooms 125 contain different kinds of lubrication oil. Namely, gear oil having a relatively high viscosity and clutch oil having a relatively low viscosity and keeping liquidity even at low temperatures are separately sealed in the rooms, respectively.

This suppresses so-called drag torque caused by the main clutches 139 and pilot clutches 193 at low temperatures in, for example, winter and prevents unprepared driving force transmission, engagement, and the like.

Embodiment 2

FIGS. 10 and 11 relate to Embodiment 2 of the present invention, in which FIG. 10 is a horizontal sectional view of a driving force distribution/transmission device and FIG. 11 is an enlarged sectional view of a clutch output adjusting mechanism. Embodiment 2 is basically similar to Embodiment 1 and the same or corresponding parts are represented with the same reference marks or the same reference marks plus "A" to avoid overlapping explanations. If necessary, the reference marks, configurations, shapes, and functions of Embodiment 1 will be referred to. The skeleton view of a vehicle of FIG. 1 is also referred to.

The driving force distribution/transmission device 1A of the present embodiment has a left-right pair of clutch output adjusting mechanisms 57A and 59A each formed as a sealed coupling. Each of a left-right pair of clutch rooms 125A is sealed and partitioned between a clutch input rotary member 135A and a clutch output rotary member 137A.

[Clutch Output Adjusting Mechanism]

The clutch output adjusting mechanisms 57A and 59A forming a left-right pair are symmetrically configured. The clutch output adjusting mechanisms 57A and 59A are connected to ends of the gear output rotary member 55, respectively, and each include a main clutch 139A that is engaged to adjust driving force output.

The clutch output adjusting mechanism 59A will be explained with reference to FIG. 11. The clutch output adjusting mechanism 57A employs the same reference marks for the corresponding parts to avoid overlapping explanations.

The clutch output adjusting mechanism 59A is contained in a clutch carrier 63A that is attached to a gear carrier 61. Around the clutch room 125A, there is a closed surrounding space 243 that is defined among the gear carrier 61, gear output rotary member 55, clutch carrier 63A, and clutch output rotary member 137A.

The surrounding space 243 contains coolant for cooling the clutch room 125A. The coolant is, for example, standard liquid coolant, oil, or gaseous coolant such as air.

The clutch room 125A contains clutch oil that is lubrication oil of a different kind from gear oil in the gear room 56, has a lower viscosity than the gear oil, and keeps liquidity at low temperatures in, for example, winter. The clutch room 125A may contain lubrication oil that is similar to the gear oil.

The clutch output adjusting mechanism 59A includes the main clutch 139A that is a frictional multiplate clutch arranged between the clutch input and output rotary members 135A and 137A.

The clutch input rotary member 135A has a joint shaft 141A and a clutch housing 143A that is integral with an outer circumferential part of an end portion of the joint shaft 141A. The clutch housing 143A has a vertical wall 151A from which a shaft coupling support 147A protrudes. On an inner circumferential face of the shaft coupling support 147A, an oil channel 147Aa axially extends in an outer circumference of a ball bearing 177. The vertical wall 151A has an oil filling hole 245 that is closed with a steel ball 247. The oil filling hole 245 is used to pour lubrication oil into the clutch room 125A.

To the clutch housing 143A, a rotor 205A is screwed and a nut 249 is used to prevent unfastening. Between the clutch housing 143A and the rotor 205A, a sealing member 251 is arranged to seal the clutch room 125A. The clutch housing 143A and rotor 205A may be fixed together by other means such as welding and bonding.

At a first end of the clutch input rotary member 135A, the joint shaft 141A is supported by the gear output rotary member 55 and a taper roller bearing 119 on a support wall 69 of the gear carrier 61. At a second end of the clutch input rotary member 135A, the rotor 205A is supported by a ball bearing 179A and a core 221A of an electromagnet 207A on a shaft support part 130A of the clutch carrier 63A.

The clutch output rotary member 137A comprises a clutch output hollow shaft 155A and a clutch hub 157A that are integral with each other. The clutch output rotary member 137A has centering parts 161A and 163A.

The clutch output rotary member 137A is hollow and the clutch output hollow shaft 155A has on its inner circumference an axle joint inner spline 165. From an outer end of the clutch output hollow shaft 155A, a rear-wheel axle 5 (3) is inserted and is connected and interlocked to the axle joint inner spline 165.

An outer circumferential face of the clutch hub 157A of the clutch output rotary member 137A is provided with a clutch spline 169A. An inner circumference at an inner end of the clutch hub 157A is provided with a closing plug 167 to keep a closed state of the clutch room 125A. Instead of the separate closing plug 167 to close the clutch room 125A, the clutch hub 157A may have a partition wall integral with the inner circumference of the clutch hub 157A.

The centering part 161A of the clutch output rotary member 137A is rotatably supported with a ball bearing 177 on the shaft coupling support 147A of the clutch input rotary member 135A. The ball bearing 177 is firmly positioned with a shim 178 and a snap ring (or washer) 180 with respect to the shaft coupling support 147A and centering part 161A.

The centering part 163A of the clutch output rotary member 137A is rotatably supported with a needle bearing 253 on the inner circumference of the rotor 205A so that the centering part 163A may rotate relative to the rotor 205A. In this way, the ends of the clutch output rotary member 137A are supported with the clutch input rotary member 135A.

At an axial outer position of the needle bearing 253, a sealing member 255 such as an X-ring is arranged between the rotor 205A and the clutch output hollow shaft 155A, to seal the clutch room 125A. In this way, the left-right pair of clutch rooms 125A each are defined between the clutch input rotary member 135A and the clutch output rotary member 137A and are sealed with the sealing members 251 and 255 and closing plug 167.

Movement from the axle 5 toward the driving force distribution/transmission device 1A is restricted by a contact face 158 between the axle 5 and the clutch output rotary member 137A, the ball bearing 177, and a contact face 160 between the clutch input rotary member 135A and the gear output rotary member 55. Even if excessive input occurs due to such moving force, the input can be received through transferring the same from the taper roller bearing 119 (117) to the gear carrier 61. An end of the clutch input rotary member 135A is in contact with the clutch carrier 63A through the electromagnet 207A and the other end thereof is in contact with the gear output rotary member 55 through the contact face 160. Consequently, the clutch input rotary member 135A is surely positioned in the axial directions.

The main clutch 139A has a plurality of outer plates 183A and a plurality of inner plates 185A. The outer plates 183A each are made of a steel thick plate without paper material. The inner plates 185A each are made of a thin plate provided with paper material or a carbon sheet, or a carbon-coated thin plate.

At an end of the main clutch 139A, the outer plate 183A is in contact with and is received by the housing vertical wall 151A of the clutch housing 143A.

The clutch output adjusting mechanism 59A includes, in addition to the main clutch 139A, a pilot clutch 193A, a ball cam 195A, a cam ring 197A, a pressure plate 199A, an armature 203A, the rotor 205A, and the electromagnet 207A for driving the pilot clutch 193A.

[Lubrication Spaces of Three Rooms]

As mentioned above, the sealed and partitioned gear room 56 accommodates a drive pinion gear 91 and a ring gear 93. The sealed couplings, i.e., the clutch output adjusting mechanisms 57A and 59A each containing the main clutch 139A are accommodated in the left-right pair of sealed and partitioned spaces 243, respectively. Each of the three independent rooms, i.e., the gear room 56 and the left-right pair of clutch rooms 125A contains lubrication oil.

Among these three independent rooms, there are a sealing member 123 between the gear carrier 61 and the gear output rotary member 55, the sealing member 251 between the clutch housing 143A and the rotor 205A, the sealing member 255 between the clutch output rotary member 137A and the rotor 205A, and the closing plug 167 between the clutch input rotary member 135A and the clutch output rotary member 137A. These sealing members 123, 251, and 255 and plug 167 secure the sealed states of the three independent rooms.

[Sub-Assembly of Clutch Output Adjusting Mechanism]

The gear carrier 61 has the sealing member 123 between the output-side support wall 69 (67) and the gear output rotary member 55, so that the gear room 56 separately seals gear oil.

Each of the clutch output adjusting mechanisms 57A and 59A has the above-mentioned configuration, and therefore, can be made as a sealed coupling and prepared as a sub-assembly as illustrated in FIG. 11.

The assembly will be explained briefly. The clutch carrier 63A has a carrier fitting part 127 and a carrier fastening flange 129 that are at the axial inner end of the clutch carrier 63A and are fitted to the gear carrier 61. At the axial outer end, the clutch carrier 63A has the support part 130A that radially inwardly protrudes.

The clutch input rotary member 135A has the joint shaft 141A that is axially removably connected to the gear output rotary member 55 through splines through axial movement.

The shaft coupling support 147A of the clutch input rotary member 135A rotatably supports, through the ball bearing 177, the first end of the clutch output rotary member 137A. The second end of the clutch output rotary member 137A is rotatably supported with the needle bearing 253 on the rotor 205A.

The electromagnet 207A is connected to the rotor 205A through the ball bearing 179A and is fixed to the clutch carrier 63A.

Each of the clutch output adjusting mechanisms 57A and 59A assembled as a sub-assembly is installed by inserting the joint shaft 141A of the clutch input rotary member 135A into an end of the gear output rotary member 55 so that the clutch input spline 145 engages with the axle joint inner spline 113 (111).

At the same time, the carrier fitting part 127 of the clutch carrier 63A is fitted to the carrier fitting opening 88 (86) of the gear carrier 61 with the sealing member 133 interposed between them.

Thereafter, the carrier fastening flange 129 is fixed to the carrier joint 84 (83) of the gear carrier 61 with the bolts 131, thereby completing the installation of the sub-assembly, i.e., the clutch output adjusting mechanism 59A (57A).

With respect to the clutch output adjusting mechanism 59A (57A), the rear-wheel axle 5 (3) is inserted into an outer end of the clutch output hollow shaft 155A and is engaged with the axle joint inner spline 165.

[Engagement Control of Main Clutch]

Engagement control of the main clutch 139A is carried out through the energization control of the electromagnet 207A.

Various sensors are used to detect road conditions and driving/steering conditions including starting, accelerating, and turning conditions, and according to the detected conditions, a controller controls the energization of the electromagnet 207A.

When energized, the electromagnet 207A attracts the armature 203A and engages the pilot clutch 193A between the armature 203A and the rotor 205A to generate pilot torque. With the pilot torque of the pilot clutch 193A, the cam ring 197A is connected to the clutch housing 143A and tries to turn together.

At this time, the pressure plate 199A is connected through the clutch hub 157A to the rear-wheel axle 5 (3), and therefore, a relative rotation occurs between the cam ring 197A and the pressure plate 199A. As a result, the ball cam 195A generates thrust to axially separate the cam ring 197A and pressure plate 199A from each other.

The thrust is applied through a thrust bearing 213 to the rotor 205A, and on the other hand, is applied through the pressure plate 199A and main clutch 139A to the housing vertical wall 151A.

Consequently, the cam thrust is received by the clutch housing 143A, to adjustably engage the main clutch 139A between the pressure plate 199A and the housing vertical wall 151A.

When the electromagnet 207A is de-energized, the ball cam 195A loses the cam thrust, and therefore, the engagement of the main clutch 139A is released.

[Lubrication]

In the gear room 56, lubrication oil is filled up to a level to immerse the whole width of the ring gear 93 at a lower part of the gear room 56. In each of the left-right pair of clutch rooms 125A, lubrication oil is filled up to a level above the axis of rotation.

In the gear room 56, the ring gear 93 turns and splashes the gear oil upward, to lubricate the meshing drive pinion gear 91 and ring gear 93 and taper roller bearings 95 and 97.

In the clutch room 125A, the clutch oil sealed between the clutch input and output rotary members 135A and 137A lubricates each part.

Due to the sliding of the main clutch 139A, the clutch output adjusting mechanism 59A (57A) generates heat. The heat is taken by the clutch oil in the clutch room 125A and the heat of the clutch oil is passed to the clutch housing 143A and to the coolant, oil, or gas such as air in the surrounding space 243. The heat received by the coolant, oil, or gas such as air is discharged outside through the clutch carrier 63A and the like.

This prevents a temperature increase of the clutch output adjusting mechanism 59A (57A), to properly conduct clutch output control.

The temperature of the clutch output adjusting mechanism 59A (57A) is inferentially measurable by arranging a temperature sensor such as a thermocouple in the surrounding space to measure the temperature of the lubrication oil or gas, or by arranging a temperature sensor on the gear carrier 61A or clutch carrier 63A to measure the temperature. Based on the measured temperature, the torque transmission characteristics of the left-right pair of clutch output adjusting mechanisms 57A and 59A can be on-demand-controlled.

Effect of Embodiment 2

Like Embodiment 1, Embodiment 2 causes no movement of lubrication oil among the left-right pair of independent clutch rooms 125A and the central gear room 56, even if the vehicle makes a turn and the like so that the body inclines to the left or the right. Namely, the lubrication oil will not be shifted from one room to another and the lubrication oils sealed in the three independent lubrication spaces is kept in the respective spaces.

The quantity of oil necessary to lubricate the main clutch 139A, pilot clutch 193A, and the like is small to suppress weight and stir resistance.

Even if the oil receives inertial force when the vehicle makes a left or right turn, the range and quantity of movement of the oil in left and right directions is suppressed to be small. In the accelerating and decelerating directions of the vehicle, at least part of the peripheries of the main clutch 139A and pilot clutch 193A is always in the lubrication oil, to improve the lubrication effect of the left and right main clutches 139A and pilot clutches 193A.

The first end of the clutch input rotary member 135A is supported by the gear carrier 61 and the second end thereof is supported by the clutch carrier 63A. Both ends of the clutch output rotary member 137A are supported by the clutch input rotary member 135A.

With this, the left-right pair of clutch output adjusting mechanisms 57A and 59A are surely supported. Even if the left and right wheels receive vibrations of different gaps from a road surface when the vehicle is running, propagation of the vibrations to the left-right pair of clutch output adjusting mechanisms 57A and 59A is suppressed to thereby improve durability.

According to Embodiment 2 of the present invention, the driving force distribution/transmission device 1A has the gear input rotary member 53 that receives a driving force and has the drive pinion gear 91, the gear output rotary member 55 that has the ring gear 93 meshing with the drive pinion gear 91 and outputs the driving force, the gear carrier 61 that accommodates and supports the gear input rotary member 53 and gear output rotary member 55, and the pair of clutch output adjusting mechanisms 57A and 59A that are connected to ends of the gear output rotary member 55, respectively, and transfer the driving force to the left and right rear-wheel axles 3 and 5. The pair of clutch output adjusting mechanisms 57A and 59A each include the clutch input rotary member 135A that is connected to and rotates together with the gear output rotary member 55, the clutch output rotary member 137A that is restricted by the clutch input rotary member 135A in axial movement, is concentrically and rotatably supported by the clutch input rotary member 135A, and is connected to and rotatable with the rear-wheel axle 5 (3), the main clutch 139A arranged between the clutch input and output rotary members 135A and 137A, the electromagnet 207A to control an engaging force of the main clutch 139A, the closing plug 167 and sealing members 251 and 255 to seal the clutch room (clutch containing space) 125A that is partitioned by the clutch input and output rotary members 135A and 137A and accommodates the main clutch 139A, and clutch oil that is contained in the clutch room 125A, to lubricate the main clutch 139A.

The clutch output adjusting mechanisms 57A and 59A are not lubricated with the gear oil sealed in the gear carrier 61, and therefore, the gear carrier 61 has no need of having a complicated shape. Unlike the related art, the left and right clutches 139A are properly lubricated without arranging a complicated means for guiding lubrication oil.

The quantity of oil required by the clutch output adjusting mechanisms 57A and 59A is small, to reduce the weight of the apparatus.

The lubricating (and cooling) functions of the clutch adjusting mechanisms 57A and 59A are equally and stably carried out, so that the engaging characteristic of the main clutch 139A will substantially be unchanged from that at the time of assembling, and therefore, the driving force transfer control for the left and right rear wheels is properly carried out and the turn attitude control for the vehicle is correctly carried out.

Before completely assembling the device 1, the pair of clutch output adjusting mechanisms 57A and 59A each are separately assembled into a sub-assembly and is tested for its performance. Namely, after measuring the characteristics of each of the clutch output adjusting mechanisms 57A and 59A, two clutch output adjusting mechanisms 57A and 59A having similar clutch characteristics are paired to assemble the device 1A. This improves productivity.

The clutch input rotary member 135A has, at the first and second ends, the housing vertical wall 151A and rotor 205A, the housing circumferential wall 150A that connects the housing vertical wall 151A and rotor 205A to each other and accommodates the main clutch 139A on the inner circumferential side, and the joint shaft 141A that extends from the housing vertical wall 151A toward the axially opposite side of the main clutch 139A and is axially inserted into the hollow gear output joint 116 (114) formed on the gear output rotary member 55. The clutch output rotary member 137A is supported by the ball bearing 177 and needle bearing 253 that are arranged on the inner circumferential sides of the housing vertical wall 151A and rotor 205A of the clutch input rotary member 135A inside the clutch room 125A. The clutch output rotary member 137A has the hollow clutch output joint 166 that is arranged outside the clutch room 125A, to receive the rear-wheel axle 5 (3).

Connection of the gear output joint 116 (114) and joint shaft 141A and connection of the clutch output joint 166 and rear-wheel axle 5 (3) are carries out while securing the clutch containing space 125A without interfering. This makes it easy to assemble the apparatus.

The clutch output adjusting mechanisms 57A and 59A each have the clutch housing 143A that is supported by the gear carrier 61 so as not to move toward the rear-wheel axles 3 and 5.

This stabilizes the positions of the clutch output adjusting mechanisms 57A and 59A.

A slant wall 257 of the clutch carrier 63A expands the surrounding space 243A and provides an improved cooling effect.

Embodiment 3

FIGS. 12 and 13 relate to Embodiment 3 of the present invention, in which FIG. 12 is a horizontal sectional view of a driving force distribution/transmission device and FIG. 13 is an enlarged sectional view of a clutch output adjusting mechanism. Embodiment 3 is configured similar to Embodiment 2, and therefore, employs the same reference marks as those of Embodiment 2 or the same reference marks plus "B" instead of "A" for the same or corresponding parts, to avoid repetitive explanations.

According to the driving force distribution/transmission device 1B of the embodiment, left and right surrounding spaces 243B communicate with each other.

On the back of a gear carrier 61B, a closed inner wall 61Ba and a closed outer wall 61Bb are formed. Between the inner and outer walls 61Ba and 61Bb, a communication path 255 is formed to connect the left and right surrounding spaces 243B to each other. The communication path 255 vertically extends along the outer wall 61Bb.

The gear carrier 61B has carrier joints 83 and 84 connected to left and right clutch carriers 63B. The carrier joints 83 and 84 are continuous to the outer wall 61Bb. Each clutch carrier 63B has a slant wall 257 to be connected to the carrier joint 84 (83). The slant wall 257 expands backward.

The sliding of main clutches 139B causes the clutch output adjusting mechanisms 57B and 59B to generate heat. According to this embodiment, like Embodiment 2, the heat of clutch oil in the clutch room 125B is passed to the clutch housing 143B and to the coolant, oil, or gas such as air in the surrounding space 243B. The heat received by the coolant, oil, or gas such as air is discharged outside through the clutch carrier 63A and the like.

In addition, the left and right surrounding spaces 243B are connected to each other through the communication path 255, to expand the surrounding spaces 243B. If the temperature of one of the left and right clutch rooms 125B increases, the coolant can evenly disperse the heat between the left and right clutch rooms 125B.

If the coolant is, for example, Hydrochlorofluorocarbon, the coolant evaporates to take heat from the surrounding space 243B around the temperature-increased clutch room 125B. The evaporated coolant moves through the communication path 255 to the other surrounding space 243B of lower temperature where the coolant discharges heat and condenses, thereby realizing a heat pump cycle. This ensures the cooling effect.

The slat wall 257 of the clutch carrier 63B expands the surrounding space 243B to improve the cooling effect.

Embodiment 4

FIGS. 14 and 15 relate to Embodiment 4 of the present invention, in which FIG. 14 is a horizontal sectional view of a driving force distribution/transmission device and FIG. 15 is an enlarged sectional view of a clutch output adjusting mechanism. Embodiment 4 is configured similar to Embodiment 2, and therefore, employs the same reference marks as those of Embodiment 2 or the same reference marks plus "C" to avoid repetitive explanations.

According to the driving force distribution/transmission device 1C of the embodiment, left and right surrounding spaces 243C communicate with a gear room 56.

More precisely, output-side support walls 67 and 69 each are provided with an opening 259 to communicate the inside of each clutch carrier 63C with the gear room 56.

Lubrication oil is filled up to the level of an axis of rotation in each of the gear room 56, surrounding spaces 243C, and clutch rooms 125C.

This allows the lubrication oil in the gear room 56 to get in contact with clutch housings 143C of clutch input rotary members 135C, to properly cool left and right clutch output adjusting mechanisms 57C and 59C and stabilize clutch characteristics. At the same time, this configuration suppresses a temperature increase of the lubrication oil in the gear room 56, prevents the deterioration of the lubrication oil, and properly feeds the lubrication oil to the meshing faces of input and output gears.

[Others]

An actuator for controlling the engaging force of the main clutch 139 may be any one that can control the engagement and disengagement of the clutch, such as an existing actuator.

Unlike the embodiments, the clutch output adjusting mechanisms 57 and 59 may not be contained or restrictively positioned between the gear carrier 61A (61B, 61C) and the clutch carriers 63A (63B, 63C). Instead, the clutch output adjusting mechanisms may be exposed to the atmospheric side.

Instead of being fixed with the positioning member such as the clutch carrier 63A (63B, 63C), the electromagnet 207A (207B, 207C) serving as an actuator may directly be fixed to, for example, the gear carrier 61. In this case, the axial position of the electromagnet 207A (207B, 207C) is most properly between the gear carrier 61A (61B, 61C) and the main clutch 139A (139B, 139C).

The gear output rotary member 55 may be connected to the clutch hubs and the axles may be connected to the clutch housings.

If a connection mechanism such as a constant-velocity joint is interposed between the axle and the driving force distribution/transmission device 1 (1A, 1B, 1C), the clutch output rotary member 137 (137A, 137B, 137C) and the joint mechanism may be formed integrally (one or a plurality of parts are integrated into one), to make functional parts compact in an axial direction.

According to the embodiments, the axle is inserted into and connected to the hollow clutch output joint 166 of the clutch output rotary member 137A (137B, 137C). The clutch output rotary member 137A (137B, 137C) and axle may be formed integrally, to reduce the number of parts, realize compactness, and decrease weight.

Figure 1:
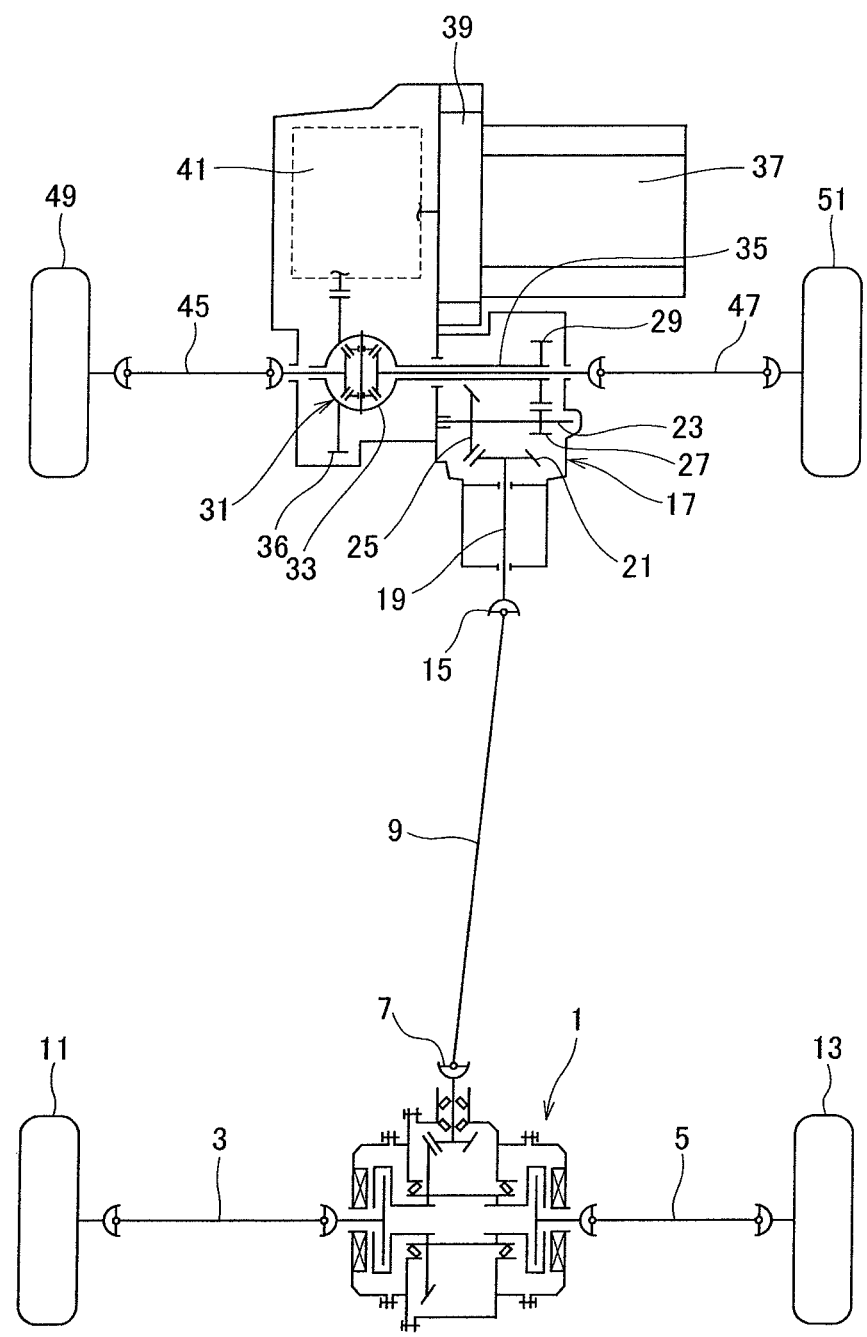
FIG. 1 It is a skeleton plan view of a four-wheel-drive, front-drive-base (FF-base) vehicle with a transverse front engine (Embodiment 1)
Figure 2:
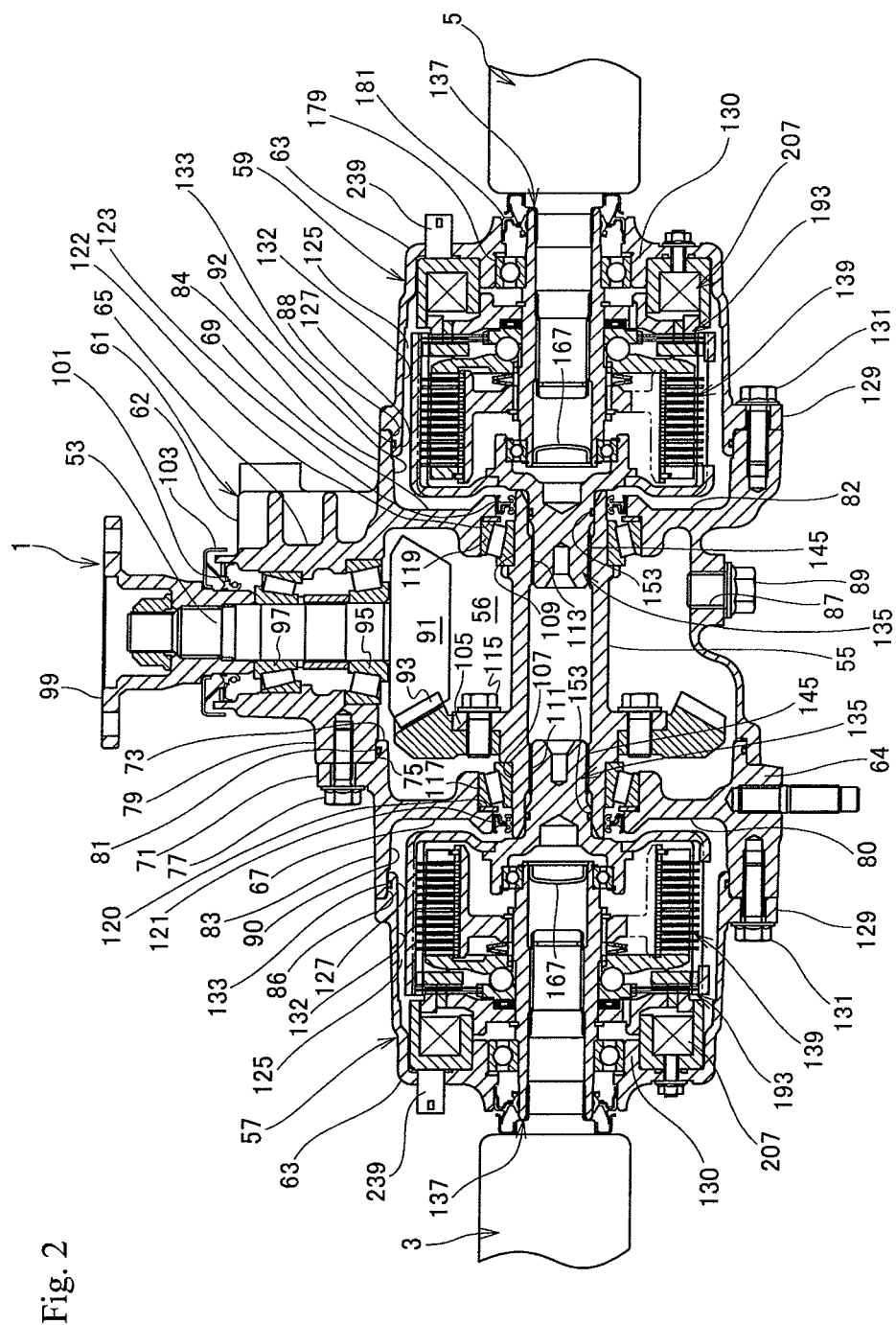
FIG. 2 It is a horizontal sectional view of a driving force distribution/transmission device (Embodiment 1)
Figure 3:
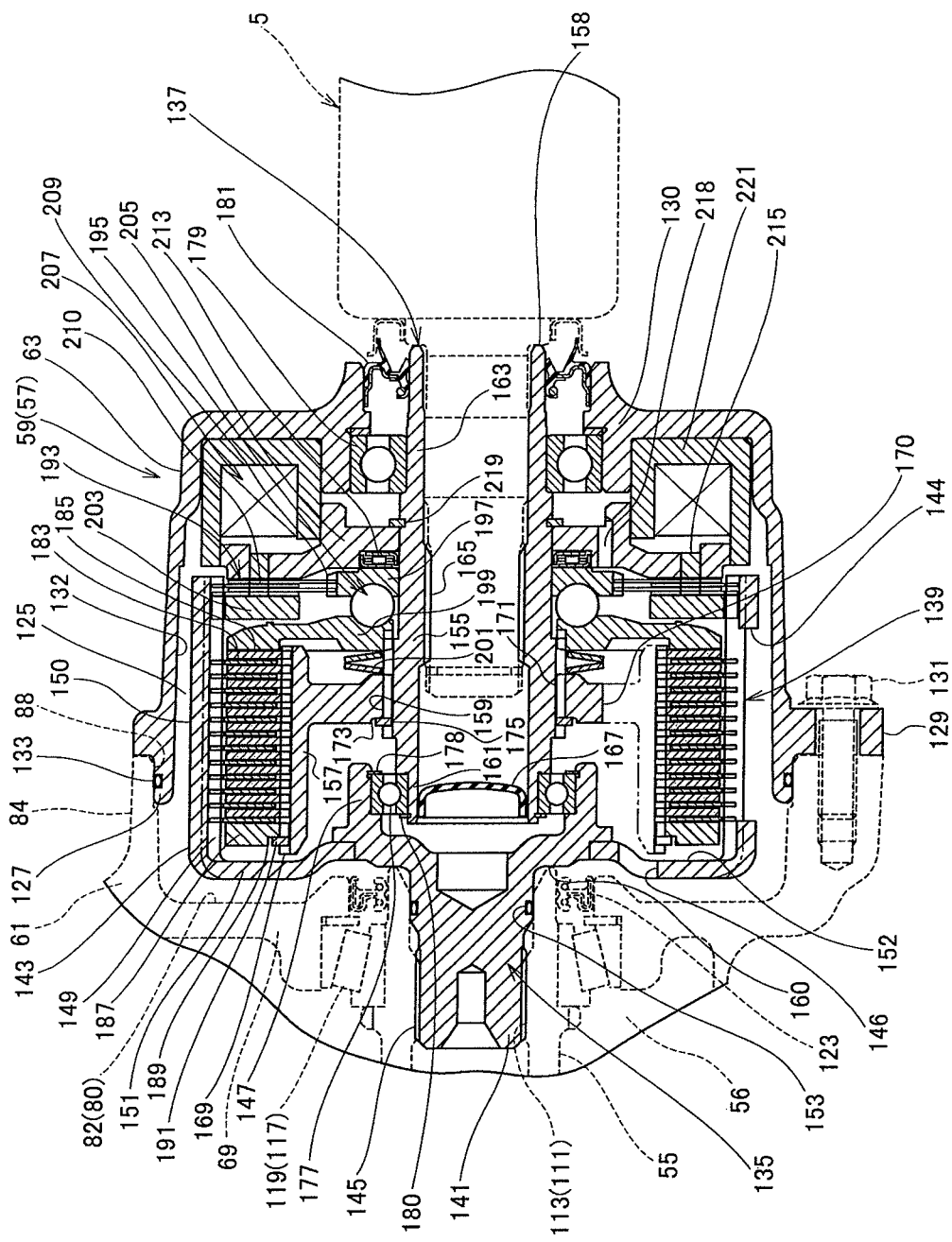
FIG. 3 It is an enlarged sectional view of a clutch output adjusting mechanism (Embodiment 1)
Figure 4:
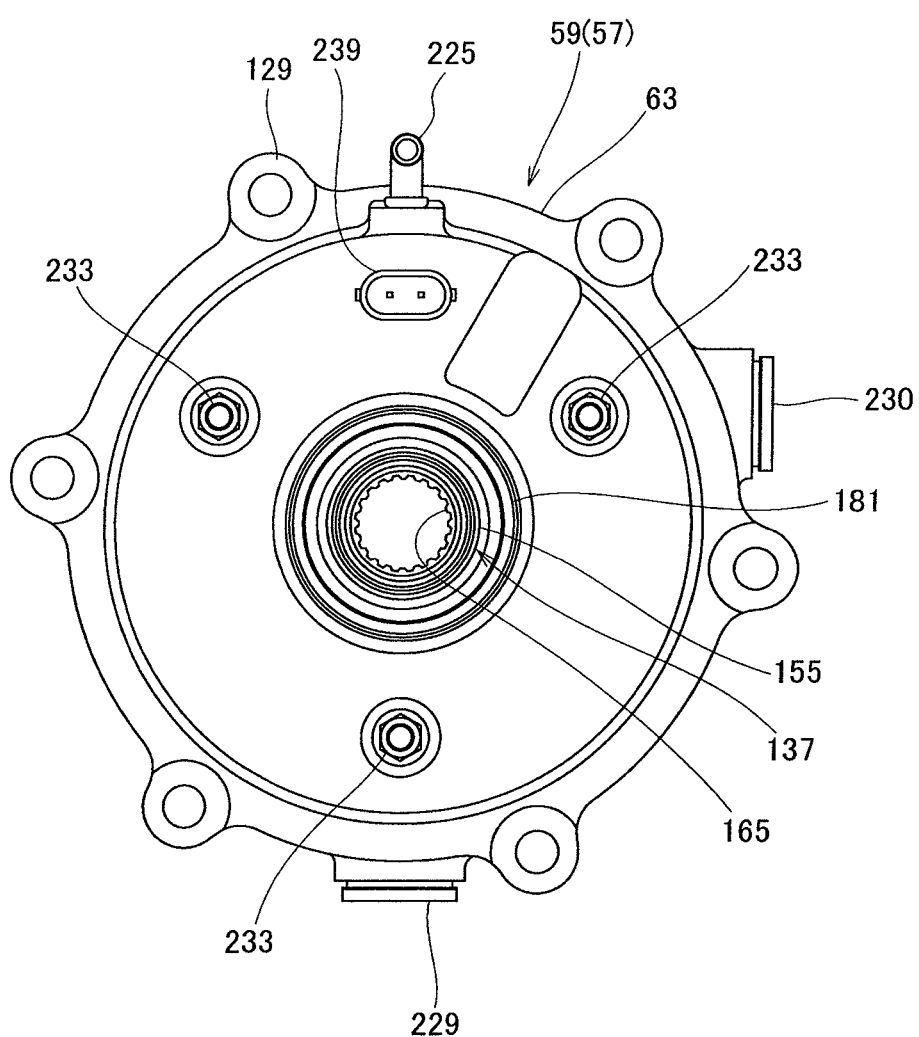
FIG. 4 It is a side view of the clutch output adjusting mechanism (Embodiment 1)
Figure 5:
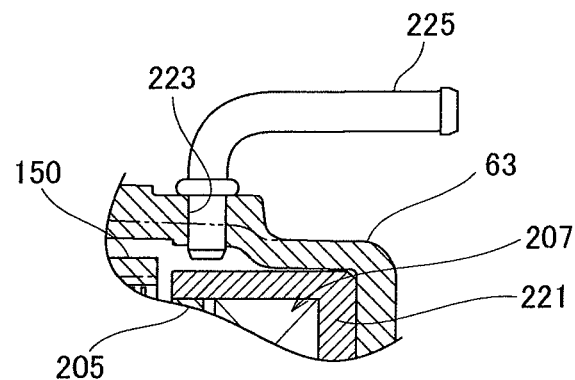
FIG. 5 It is an enlarged sectional view of a breather installing part (Embodiment 1)
Figure 6:
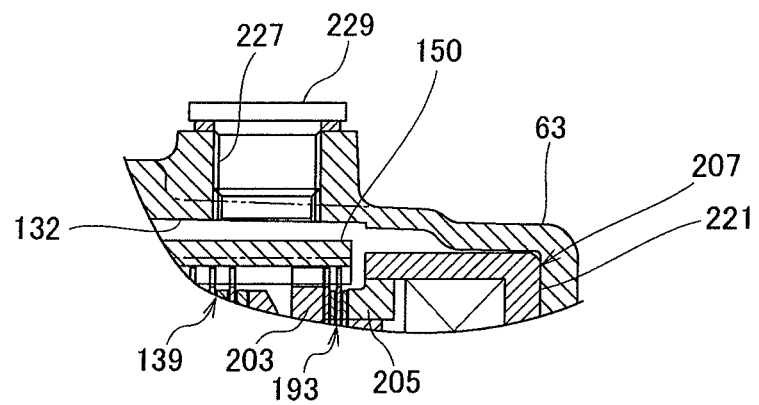
FIG. 6 It is an enlarged sectional view of a drain plug installing part (Embodiment 1)
Figure 7:
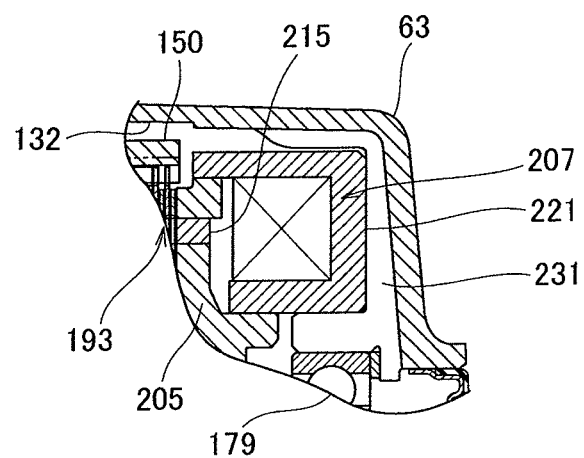
FIG. 7 It is an enlarged sectional view of an oil channel (Embodiment 1)
Figure 8:
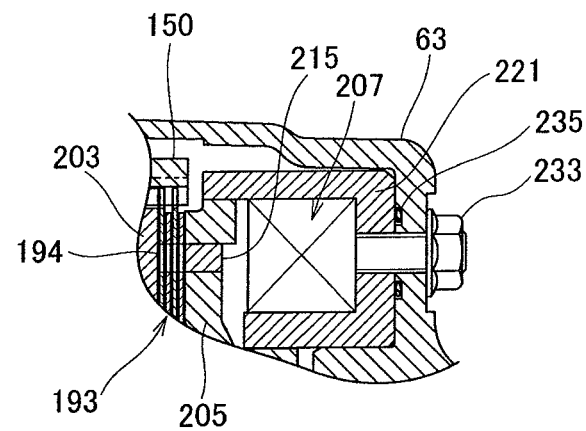
FIG. 8 It is an enlarged sectional view of a magnet rotation stopper (Embodiment 1)
Figure 9:
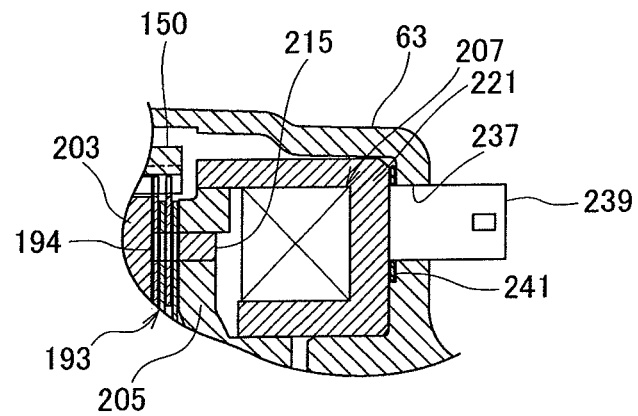
FIG. 9 It is an enlarged sectional view of a connector installing part (Embodiment 1)
Figure 10:
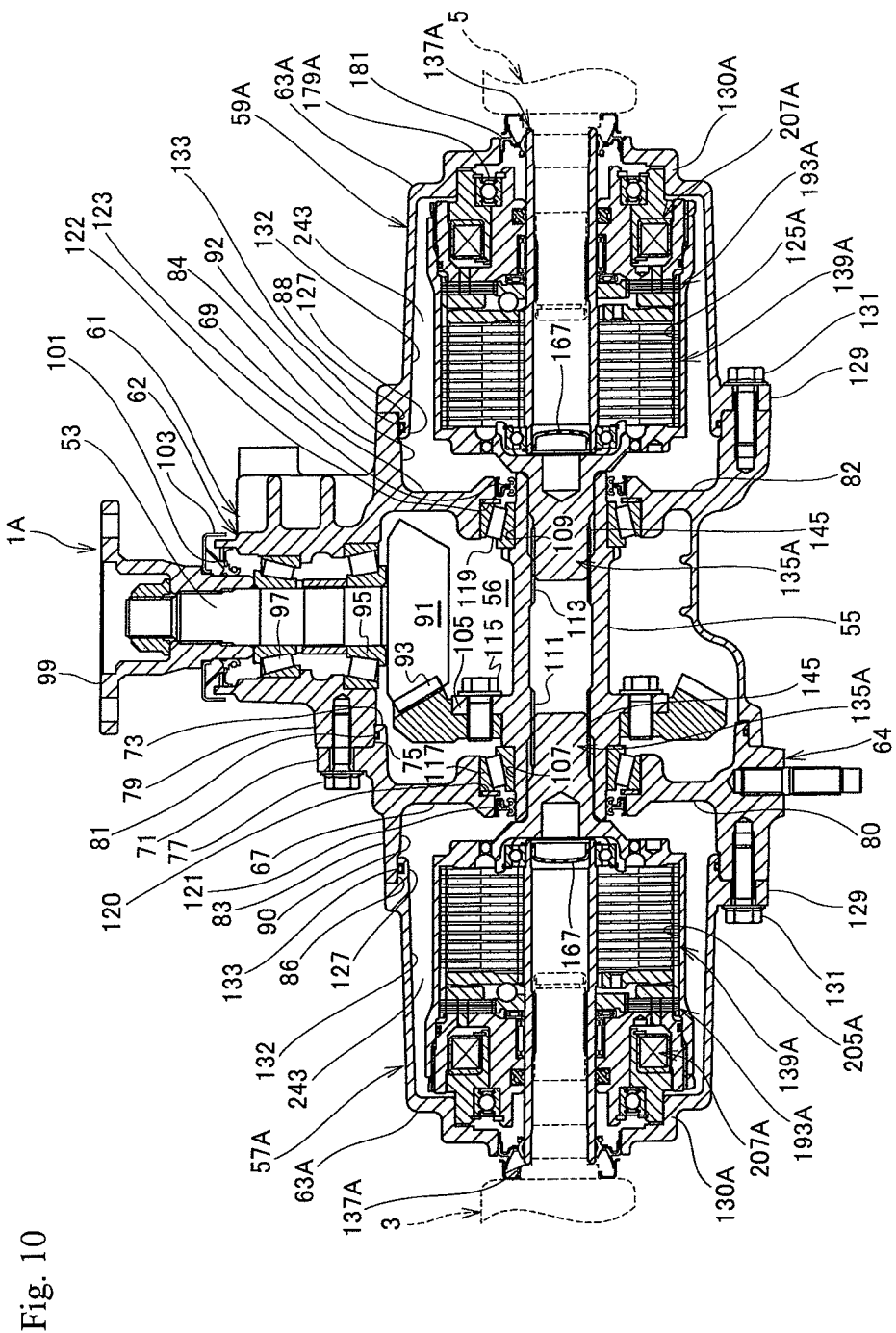
FIG. 10 It is a horizontal sectional view of a driving force distribution/transmission device (Embodiment 2)
Figure 11:
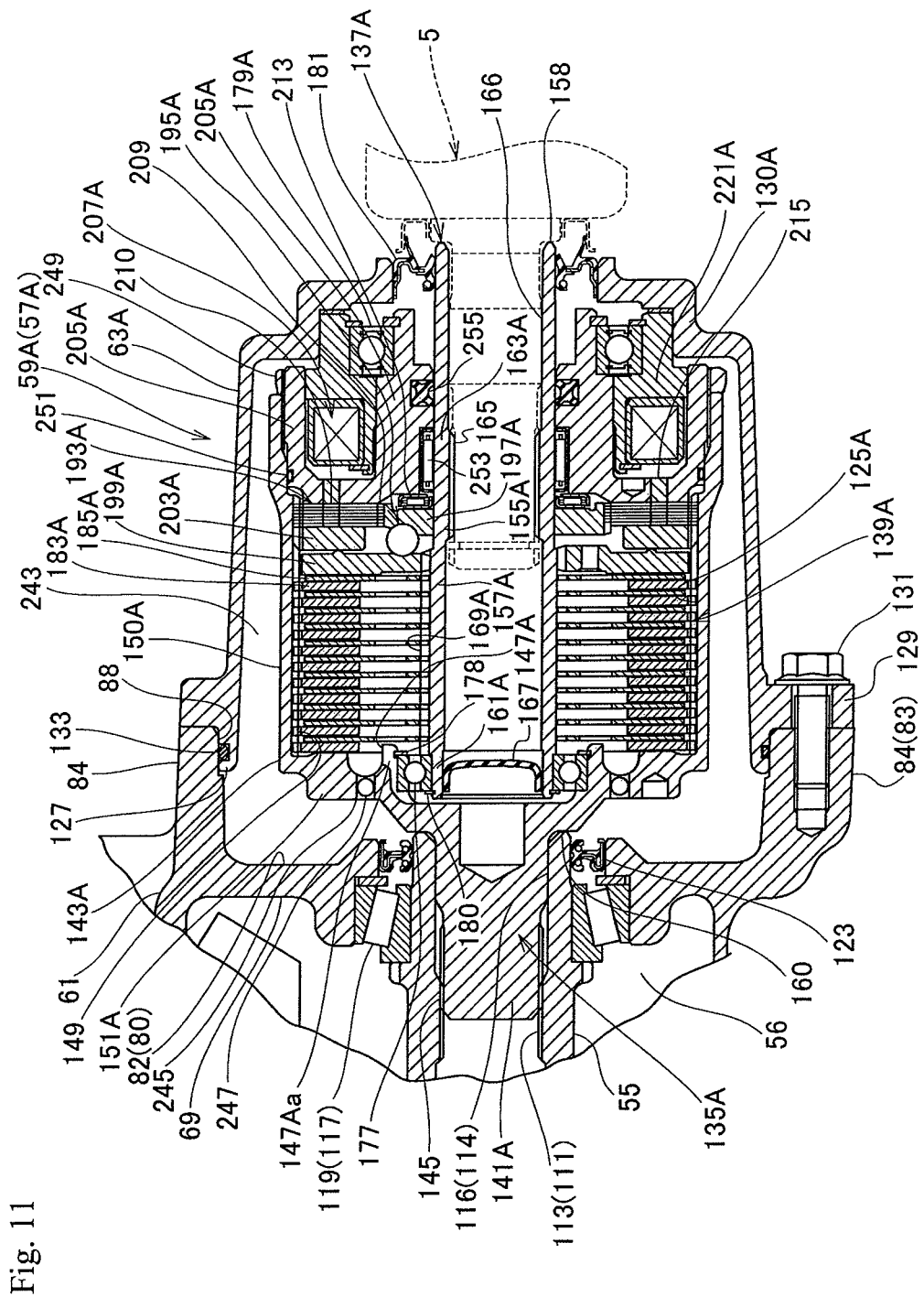
FIG. 11 It is an enlarged sectional view of a clutch output adjusting mechanism (Embodiment 2)
Figure 12:
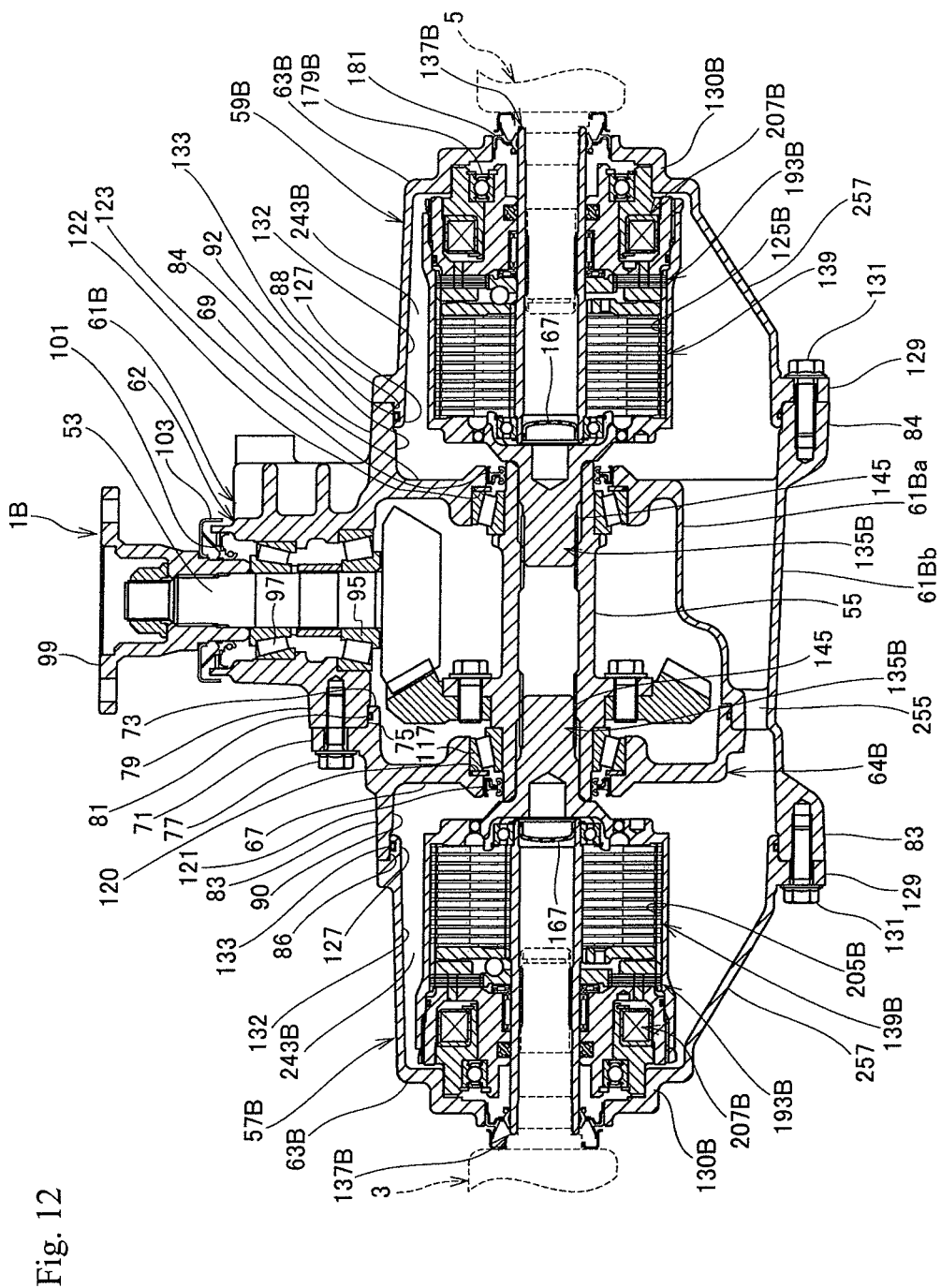
FIG. 12 It is a horizontal sectional view of a driving force distribution/transmission device (Embodiment 3)
Figure 13:
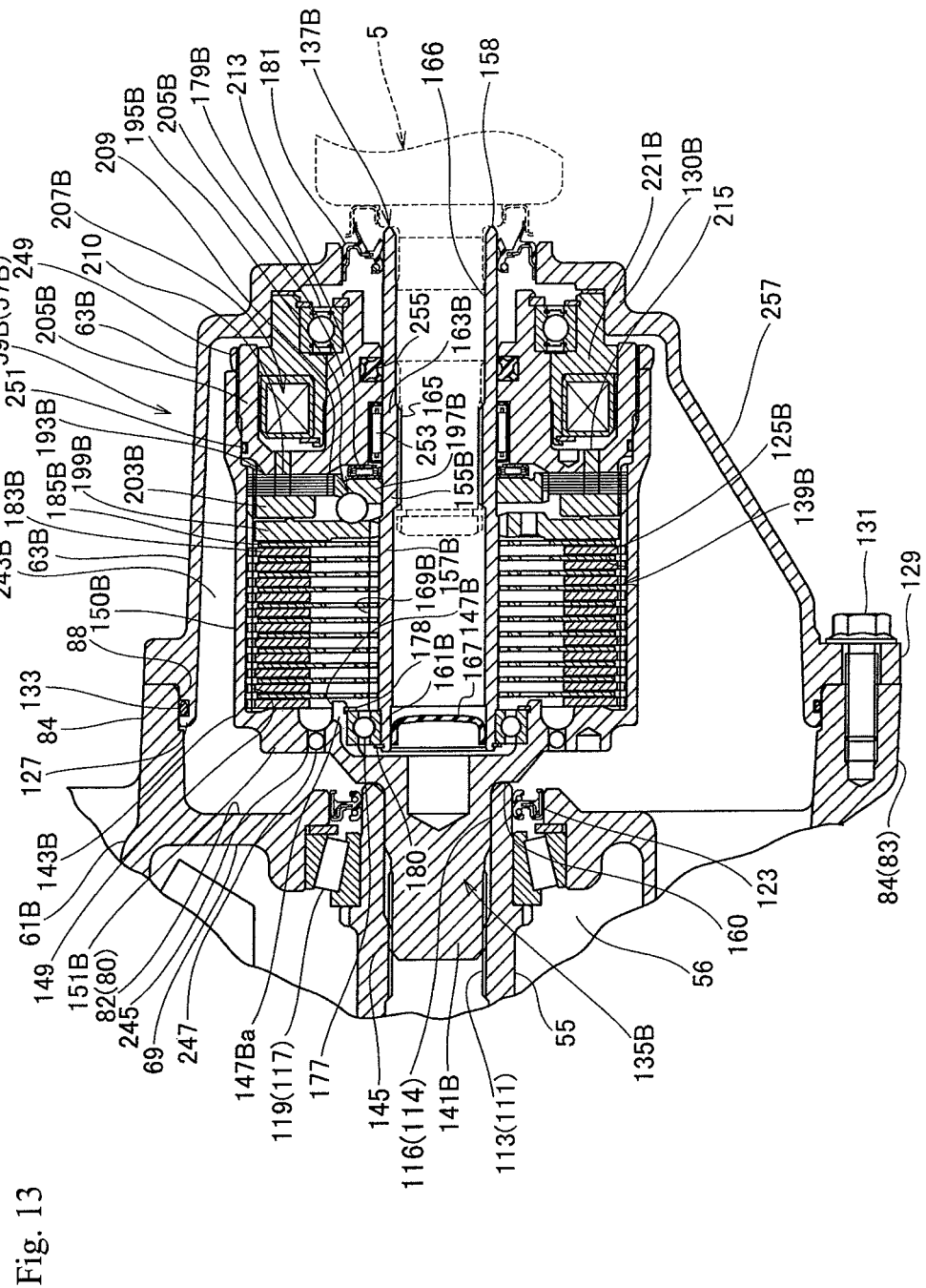
FIG. 13 It is an enlarged sectional view of a clutch output adjusting mechanism (Embodiment 3)
Figure 14:
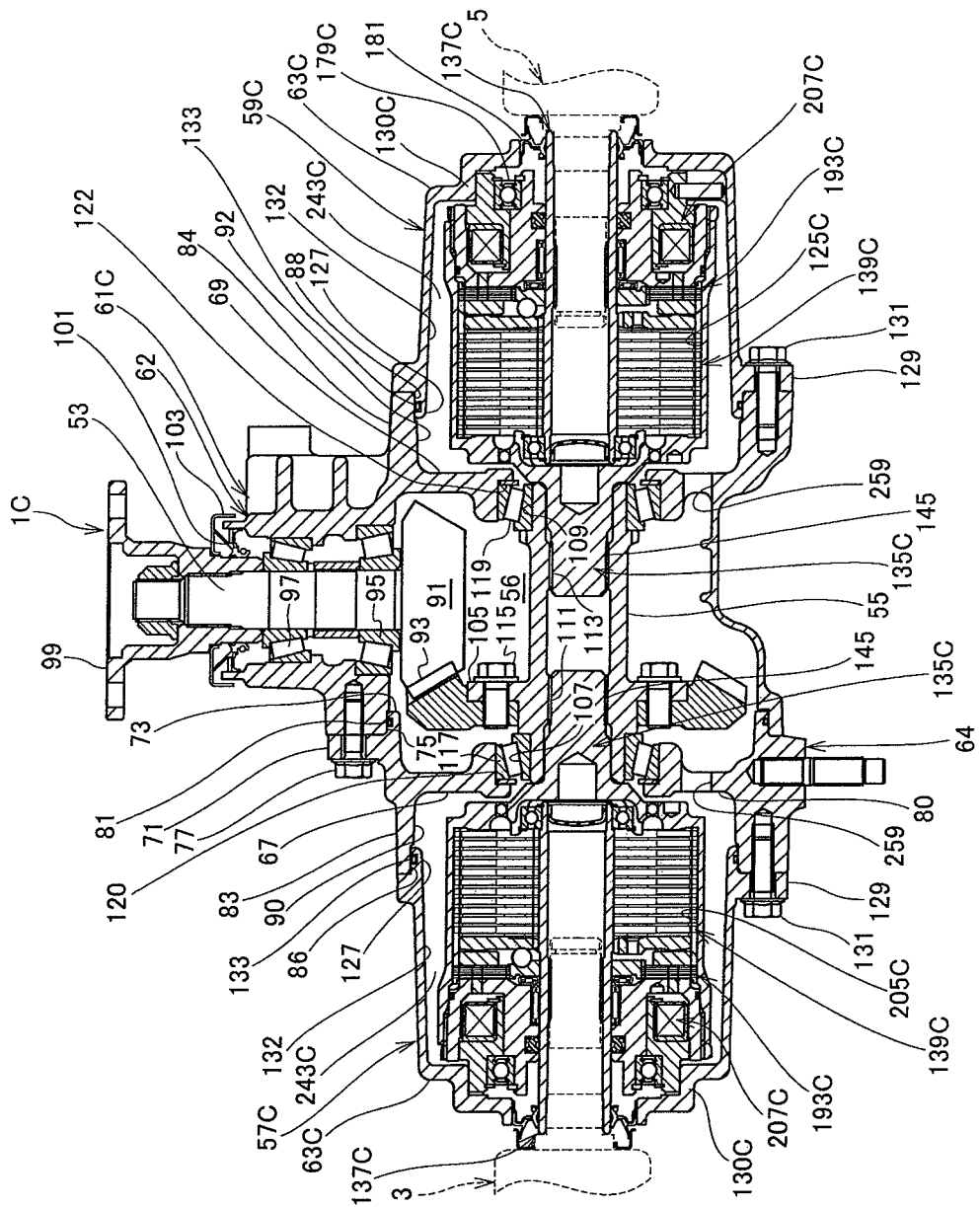
FIG. 14 It is a horizontal sectional view of a driving force distribution/transmission device (Embodiment 4)
Figure 15:
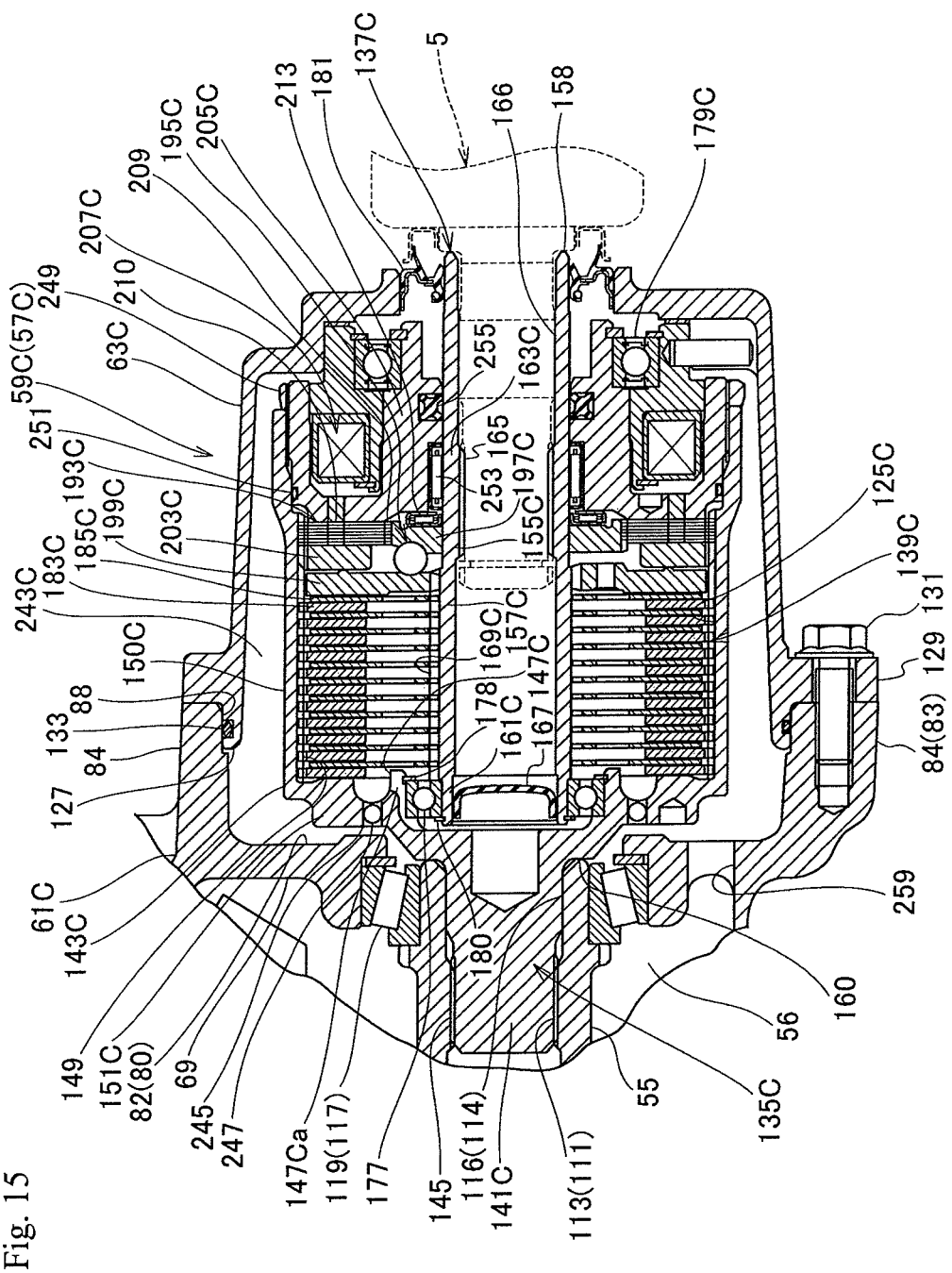
FIG. 15 It is an enlarged sectional view of a clutch output adjusting mechanism (Embodiment 4)

DESCRIPTION OF NOTATIONS 1, 1A, 1B, 1C: Driving force distribution/transmission device
53: Gear input rotary member
55: Gear output rotary member
56: Gear room
57, 57A, 57B, 57C, 59, 59A, 59B, 59C: Clutch output adjusting mechanism
61, 61B, 61C: Gear carrier
63, 63A, 63B, 63C: Clutch carrier
91: Drive pinion gear (Two gears arranged on different axes)
93: Ring gear (Two gears arranged on different axes)
125, 125A, 125B, 125C: Clutch room
121, 123, 133, 181, 251, 255: Sealing member
127: Carrier fitting part
130: Shaft support part
130A, 130B, 130C: Support part
133, 153: Sealing member interposed between two members that do not rotate relative to each other
135, 135A, 135B, 135C: Clutch input rotary member
137, 137A, 137B, 137C: Clutch output rotary member
139, 139A, 139B, 139C: Main clutch (Frictional multiplate clutch)
141, 141A, 141B, 141C: Joint shaft
144: Through window (Second communication part)
146: Housing oil hole (Third communication part)
155, 155A, 155B, 155C: Clutch output hollow shaft (Clutch output rotary member)
157: Clutch hub (Clutch output rotary member)
157A, 157B, 157C: Clutch hub
167: Closing plug (Closing member)
170: Hub through part (First communication part)
175, 219: Snap ring (Stopper)
177, 179, 179A, 179B, 179C: Ball bearing (Bearing)
193, 193A, 193B, 193C: Pilot clutch
197, 197A, 197B, 197C: Cam ring
199, 199A, 199B, 199C: Pressure plate
203, 203A, 203B, 203C: Armature
205, 205A, 205B, 205C: Rotor
207, 207A, 207B, 207C: Electromagnet (Operation source)
215: Nonmagnetic part

218: Rotor oil hole (Fourth communication part)
231: Oil channel (Fifth communication part)
243, 243B, 243C: Surrounding space
255: Communication path
259: Opening

The invention claimed is:

1. A driving force distribution/transmission device comprising:
   a gear input rotary member and a gear output rotary member that are interlocked to transmit a driving force through the meshing of two gears arranged on different axes;
   a left-right pair of clutch output adjusting mechanisms coupled with both ends of the gear output rotary member, to carry out a driving force output adjustment through engagement of frictional multiplate clutches;
   a closed and partitioned gear room containing the two gears arranged on the different axes therein, a left-right pair of closed and partitioned clutch rooms containing the frictional multiplate clutches therein, respectively, the gear room and the left-right pair of clutch rooms sealed off from each other so that a lubrication oil does not move from one of the gear room and the left-right pair of clutch rooms to others of the gear room and the left-right pair of clutch rooms; and
   lubrication spaces in the three separate rooms that are the gear room and the left-right pair of clutch rooms each sealing lubrication oil therein.

2. The driving force distribution/transmission device as set forth in claim 1, wherein
   the clutch room is closed with a sealing member interposed between two members that do not rotate relative to each other.

3. The driving force distribution/transmission device as set forth in claim 1, wherein
   the gear room and left-right pair of clutch rooms seal lubrication oil of different kinds therein.

4. The driving force distribution/transmission device as set forth in claim 1, wherein
   the clutch output adjusting mechanisms each include a clutch input rotary member connected to the gear output rotary member such that the clutch input rotary member and the gear output rotary member rotates together, a clutch output rotary member that is rotatably concentrically supported by the clutch input rotary member and to which an axle is connected to rotate together, the frictional multiplate clutch arranged between the clutch input and output rotary members, an actuator to control an engaging force of the frictional multiplate clutch, sealing members to seal a clutch accommodating space that is partitioned by the clutch input and output rotary members and accommodates the frictional multiplate clutch, and lubrication oil that is contained in the clutch accommodating space and lubricates the frictional multiplate clutch.

5. The driving force distribution/transmission device as set forth in claim 4, wherein
   the clutch output adjusting mechanism has movement restricting members supported by the carriers to restrict movement of the clutch output adjusting mechanism in axle directions.

6. The driving force distribution/transmission device as set forth in claim 1, further comprising:
   a gear carrier to rotatably support the gear input rotary member and gear output rotary member;
   clutch carriers attached to the gear carrier and containing the clutch output adjusting mechanisms;
   the clutch output adjusting mechanisms each having a clutch input rotary member coupled with the gear output rotary member, a clutch output rotary member, and the frictional multiplate clutch interposed between the clutch input and output rotary members; and
   the left-right pair of clutch rooms each being partitioned and formed between the clutch input rotary member and the clutch output rotary member.

7. The driving force distribution/transmission device as set forth in claim 6, wherein
   a first end of the clutch input rotary member is supported by the gear carrier and a second end thereof is supported by the clutch carrier; and
   both ends of the clutch output rotary member are supported by the clutch input rotary member.

8. The driving force distribution/transmission device as set forth in claim 6, wherein:
   a closed partitioned surrounding space is arranged around each clutch room among the gear carrier, gear output rotary member, clutch carrier, and clutch output rotary member, and
   both the surrounding spaces communicate with each other.

9. The driving force distribution/transmission device as set forth in claim 6, wherein
   the gear carrier has output-side support walls that support the gear output rotary member and separate the gear room from the inside of each clutch carrier, and
   each output-side support wall is provided with an opening that connects the inside of the clutch carrier to the gear room.

10. The driving force distribution/transmission device as set forth in claim 6, wherein
    a closed partitioned surrounding space is arranged around each clutch room among the gear carrier, gear output rotary member, clutch carrier, and clutch output rotary member, and
    the surrounding space contains coolant to cool the clutch room.

11. The driving force distribution/transmission device as set forth in claim 1, further comprising:
    a gear carrier rotatably supporting the gear input rotary member and gear output rotary member and forming the gear room; and
    clutch carriers attached to the gear carrier and forming the left-right pair of clutch rooms.

12. The driving force distribution/transmission device as set forth in claim 11, wherein
    the clutch output adjusting mechanism includes a clutch input rotary member coupled with the gear output rotary member and a clutch output rotary member rotatably supported by the clutch carrier to output a transmitted driving force, and the frictional multiplate clutch being interposed between the clutch input and output rotary members, and
    sealing members are interposed between the gear carrier and the clutch carrier, between the gear carrier and the gear output rotary member, between the gear output rotary member and the clutch input rotary member, and between the clutch carrier and the clutch output rotary member.

13. The driving force distribution/transmission device as set forth in claim 12, wherein
    the clutch carrier includes, at an axially inner end portion, a carrier fitting part attached to the gear carrier, and at an axially outer end portion, a shaft support part protruding in a radially inner direction, the clutch input rotary member includes a joint shaft that is axially removably coupled and interlocked with the gear output rotary member, and a first end of the clutch output rotary member rotatably supports the clutch input rotary member through a bearing and a second end of the clutch output rotary member is rotatably supported by the shaft support part through a bearing.

14. The driving force distribution/transmission device as set forth in claim 13, further comprising:

a pressure plate arranged adjacent to the frictional multiplate clutch and engaging with an outer circumference of the clutch output rotary member so as to be rotatable together with the clutch output rotary member and be axially movable to engage the frictional multiplate clutch;

a cam ring axially facing the pressure plate with a cam mechanism being interposed between them, the cam ring being relatively rotatably supported by the outer circumference of the clutch output rotary member;

a pilot clutch arranged between the clutch input rotary member and the cam ring; and an operation source fixed to the clutch carrier and configured to engage the pilot clutch.

15. The driving force distribution/transmission device as set forth in claim 14, wherein the clutch input rotary member and clutch output rotary member are provided with first and second communication parts to open the inner and outer circumferential sides of the frictional multiplate clutch to pass lubrication oil from the inner circumferential side of the frictional multiplate clutch to the inner circumferential side of the clutch carrier on the outer circumferential side of the frictional multiplate clutch, and the clutch input rotary member is provided with a third communication part that axially extends between the joint shaft part and the frictional multiplate clutch.

16. The driving force distribution/transmission device as set forth in claim 14, wherein the clutch output rotary member comprises a clutch output hollow shaft that is hollow to receive an axle from an outer end and be joined and interlocked with the axle, and a clutch hub that spline-engages with an outer circumference of the clutch output hollow shaft, and the outer circumference of the clutch output hollow shaft is provided with a stopper that restricts axial movement of the clutch hub and receives cam thrust of the cam mechanism.

17. The driving force distribution/transmission device as set forth in claim 14, wherein the operation source is an electromagnet that faces an armature with a pilot clutch interposing between them, is adjacent to a rotor having a nonmagnetic part, is fixedly supported by the clutch carrier, and is configured to form a flux loop that extends from the periphery of the nonmagnetic part of the rotor to the armature, and the rotor is provided with a fourth communication part that axially extends on the radially inner side of the electromagnet, and a fifth communication part is formed between the clutch carrier and the electromagnet so as to extend from the inner circumferential face side of the clutch carrier, pass behind the electromagnet, and communicate with the clutch room on the radially inner side of the electromagnet.

18. A driving force distribution/transmission device comprising:

a gear input rotary member and a gear output rotary member that are interlocked to transmit a driving force through the meshing of two gears arranged on different axes;

a left-right pair of clutch output adjusting mechanisms coupled with both ends of the gear output rotary member, to carry out a driving force output adjustment through engagement of frictional multiplate clutches;

a closed and partitioned gear room containing the two gears arranged on the different axes therein, a left-right pair of closed and partitioned clutch rooms containing the frictional multiplate clutches therein, respectively;

lubrication spaces in the three separate rooms that are the gear room and the left-right pair of clutch rooms separately sealing lubrication oil therein;

a gear carrier rotatably supporting the gear input rotary member and gear output rotary member and forming the gear room; and clutch carriers attached to the gear carrier and forming the left-right pair of clutch rooms; and wherein the clutch output rotary member has a clutch output hollow shaft that is hollow to receive an axle from an outer end and be joined and interlocked with the axle, wherein an outer periphery at an inner end of the clutch output hollow shaft rotatably supports the clutch input rotary member through a bearing, and wherein an inner circumference at the inner end of the clutch output hollow shaft is provided with a closing member to keep the clutch room in a sealed state.

19. A driving force distribution/transmission device comprising:

a gear input rotary member and a gear output rotary member that are interlocked to transmit a driving force through the meshing of two gears arranged on different axes;

a left-right pair of clutch output adjusting mechanisms coupled with both ends of the gear output rotary member, to carry out a driving force output adjustment through engagement of frictional multiplate clutches;

a closed and partitioned gear room containing the two gears arranged on the different axes therein, a left-right pair of closed and partitioned clutch rooms containing the frictional multiplate clutches therein, respectively; and lubrication spaces in the three separate rooms that are the gear room and the left-right pair of clutch rooms separately sealing lubrication oil therein; and wherein the clutch output adjusting mechanisms each include a clutch input rotary member connected to the gear output rotary member such that the clutch input rotary member and the gear output rotary member rotate together, a clutch output rotary member that is rotatably concentrically supported by the clutch input rotary member and to which an axle is connected to rotate together, the frictional multiplate clutch arranged between the clutch input and output rotary members, an actuator to control an engaging force of the frictional multiplate clutch, sealing members to seal a clutch accommodating space that is partitioned by the clutch input and output rotary members and accommodates the frictional multiplate clutch, and lubrication oil that is contained in the clutch accommodating space and lubricates the frictional multiplate clutch;

wherein the clutch input rotary member has partition walls at first and second ends thereof, a cylindrical part to connect the partition walls to each other and contain the frictional multiplate clutch on the inner circumferential side thereof, and a joint shaft part that extends from the partition wall at the first end toward the axially opposite side of the frictional multiplate clutch and is axially inserted into and connected with a hollow gear output joint part formed on the gear output rotary member; and wherein the clutch output rotary member is supported by support members that are arranged in the clutch accommodating space on the inner circumferential sides of the partition walls at the first and second ends of the clutch input rotary member and has a hollow clutch output joint part which is arranged outside the clutch accommodating space and to which the axle is inserted and connected.

* * * * *